(12) United States Patent
Rokuhara et al.

(10) Patent No.: US 10,097,712 B2
(45) Date of Patent: Oct. 9, 2018

(54) PRINTING DEVICE AND METHOD FOR CONTROLLING PRINTER

(71) Applicant: SEIKO EPSON CORPORATION, Tokyo (JP)

(72) Inventors: Noritsuna Rokuhara, Nagano (JP); Tetsuji Takeishi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/483,249

(22) Filed: Apr. 10, 2017

(65) Prior Publication Data

US 2017/0302804 A1    Oct. 19, 2017

(30) Foreign Application Priority Data

Apr. 18, 2016 (JP) ................................ 2016-083232

(51) Int. Cl.

| G06K 15/00 | (2006.01) |
| H04N 1/04 | (2006.01) |
| H04N 1/00 | (2006.01) |
| G06K 15/02 | (2006.01) |
| B41J 11/00 | (2006.01) |
| B41J 19/20 | (2006.01) |

(52) U.S. Cl.
CPC ........ *H04N 1/0071* (2013.01); *B41J 11/0095* (2013.01); *B41J 19/202* (2013.01); *G06K 15/02* (2013.01); *H04N 1/00015* (2013.01); *H04N 1/00604* (2013.01); *H04N 1/00713* (2013.01); *H04N 1/00748* (2013.01); *H04N 2201/0082* (2013.01)

(58) Field of Classification Search
CPC ............. H04N 1/0071; H04N 1/00015; H04N 1/00604; H04N 1/00713; H04N 1/00748; H04N 2201/0082; G06B 15/02
USPC ........................................ 358/1.12, 1.2, 488
See application file for complete search history.

(56) References Cited

U.S. PATENT DOCUMENTS

| 2013/0074720 A1 | 3/2013 | Yamauchi |
| 2017/0232765 A1* | 8/2017 | Moriyama ................. B41J 2/01 347/16 |

FOREIGN PATENT DOCUMENTS

JP    2013-71357 A    4/2013

* cited by examiner

*Primary Examiner* — Cheukfan Lee

(57) ABSTRACT

A control unit causes a carriage to move in a width direction under a first movement control of changing a location of the carriage with a first resolution so that a sensor located forward in movement detects an edge of a medium. Thereafter, the first movement control is switched to a second movement control of changing the location of the carriage with a second resolution higher than the first resolution and the carriage is caused to move in the width direction so that a sensor located rearward in movement detects the edge.

14 Claims, 11 Drawing Sheets

PRINTING DEVICE AND METHOD FOR CONTROLLING PRINTER

INCORPORATED BY REFERENCE

The entire disclosure of Japanese Patent Application No. 2016-083232, filed Apr. 18, 2016 is expressly incorporated by reference herein.

BACKGROUND

1. Technical Field

The present disclosure relates to a printing device.

2. Related Art

In the field of printing devices, to determine the size of a medium such as a paper sheet, the length of the paper sheet in a width direction (paper sheet width) perpendicular to a paper sheet transport direction is detected in some cases.

A known printing device performs a first control that obtains a detection result of a sensor whenever a head unit moves only a first interval while the head unit is caused to move to a specific direction from a reference position and a second control that, when a change from the presence of a sheet to the absence of the sheet or from the absence of the sheet to the presence of the sheet is detected by the sensor during the first control, obtains the detection result of the sensor whenever the head unit moves only a second interval that is shorter than the first interval while the head unit is caused to move by the drive unit to a specific direction from a position that is apart, only by the first interval, from a detection position of the change during the first control, in a direction opposite to the specific direction, and a control unit recognizes the detection position of the change from the second control as an edge position in the width direction of the sheet when the change from the presence of the sheet to the absence of the sheet or from the absence to the presence of the sheet is detected by the sensor during the second control (refer to JP-A-2013-71357).

SUMMARY

There has been a demand for detecting a paper sheet width more accurately in a shorter time. The method of JP-A-2013-71357, however, requires a complicated operation of moving the head unit in the specific direction, to the opposite direction, and then to the specific direction again and, therefore, needs a long time for detecting a sheet edge.

Another conceivable configuration includes a linear encoder or a rotary encoder that incorporates a sensor for detecting a sheet edge and outputs a pulse in accordance with the amount of movement of a carriage movable along the width direction. Such a configuration can specify the position of the carriage when the sensor detects the sheet edge from the output of the encoder and, thus, can detect the position of the sheet edge or the sheet width. The presence of the encoder, however, causes problems of increased costs and difficulty in obtaining an installation location.

An advantage of some aspects of the disclosure is to provide a printing device that can detect a medium width accurately in a short time.

According to an aspect of the present disclosure, a printing device includes, a transport unit that transports a medium, a print head that performs printing on the medium, a carriage that moves in a width direction intersecting a transport direction of the medium by the transport unit; two sensors mounted on the carriage and disposed at different locations in the width direction, and a control unit that controls at least movement of the carriage. The control unit is switchable between a first movement control of changing a location of the carriage with a first resolution and a second movement control of changing a location of the carriage with a second resolution higher than the first resolution. The control unit causes the carriage to move under the first movement control so that a first edge of the medium is detected by one of the two sensors located forward in movement. Thereafter, the control unit switches from the first movement control to the second movement control and causes the carriage to move so that the first edge of the medium is then detected by one of the two sensors located rearward in movement. Subsequently, the control unit switches from the second movement control to the first movement control and causes the carriage to move so that a second edge of the medium is detected by the forward sensor. Then, the control unit switches from the first movement control to the second movement control and causes the carriage to move. Thereafter, when the rearward sensor detects the second edge of the medium, the control unit calculates a length in the width direction of the medium based on detection results of the first and second edges of the medium obtained by the rearward sensor.

With this configuration, at the timing when the rearward sensor detects a first edge or a second edge of the paper sheet, movement of the carriage is controlled with the second resolution. Thus, the length of the medium in the width direction (medium width) is calculated based on the detection results on the first and second edges obtained by the rearward sensor so that an accuracy in detecting the medium width can be enhanced. In addition, since movement of the carriage is controlled with the first resolution in most part of the period except the timings described above, the carriage can be moved at high speed with a reduced burden on the control unit.

According to another aspect of the present disclosure, in a case where one of the two sensors detects the medium while the carriage is located at one end of a movable range in which the carriage is movable in the width direction, the control unit may move a first range based on a previously specified size of the medium under the second movement control in a process of causing the carriage to move from the one end of the movable range toward the other end of the movable range, then move a second range based on the size of the medium under the first movement control, and after the movement of the second range, the control unit moves a third range based on the size of the medium under the second movement control, and then calculate a length of the medium in the width direction based on a detection result of the first edge of the medium obtained by the rearward sensor in movement of the carriage in the first range, a detection result of the second edge of the medium obtained by the forward sensor in movement of the carriage in the third range, and a distance between the two sensors in the width direction.

With this configuration, even in a case where one of the two sensors detects the medium in a situation where the carriage is located at the one end because of a large medium width, the medium width can be accurately detected.

According to another aspect of the present disclosure, the carriage may be movable in the width direction independently of the print head at a location upstream of the print head in the transport direction.

With this configuration, the medium width can be detected before the print head is driven in order to perform printing on the medium.

The medium width can be detected at various possible timings. For example, the control unit may calculate the length in the width direction of the medium that is first transported by the transport unit from a predetermined transport source of the medium after power is turned on. The control unit may calculate the length in the width direction of the medium that is first transported by the transport unit from a cassette as a predetermined transport source of the medium after the cassette is drawn from a body casing and is housed in the body casing while power is on. The control unit may calculate the length in the width direction of the medium that is first transported by the transport unit from a manual feed tray as a predetermined transport source of the medium after the medium is set on the manual feed tray.

With these configurations, the medium width can be detected at an appropriate timing for detecting the medium width.

A technical idea of the present disclosure is implemented by a technique except a printing device. For example, a method including processes executed by components of a printing device (a medium width detection method) may be an aspect of the disclosure. A program that causes a computer to execute such a method or a computer-readable storage medium storing the program can be aspects of the disclosure.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

An embodiment of the present disclosure will be described hereinafter with reference to the drawings. The drawings are merely example illustrations of the embodiment. Among the drawings, shapes and dimensions do not necessarily match one another.

Figure 1:
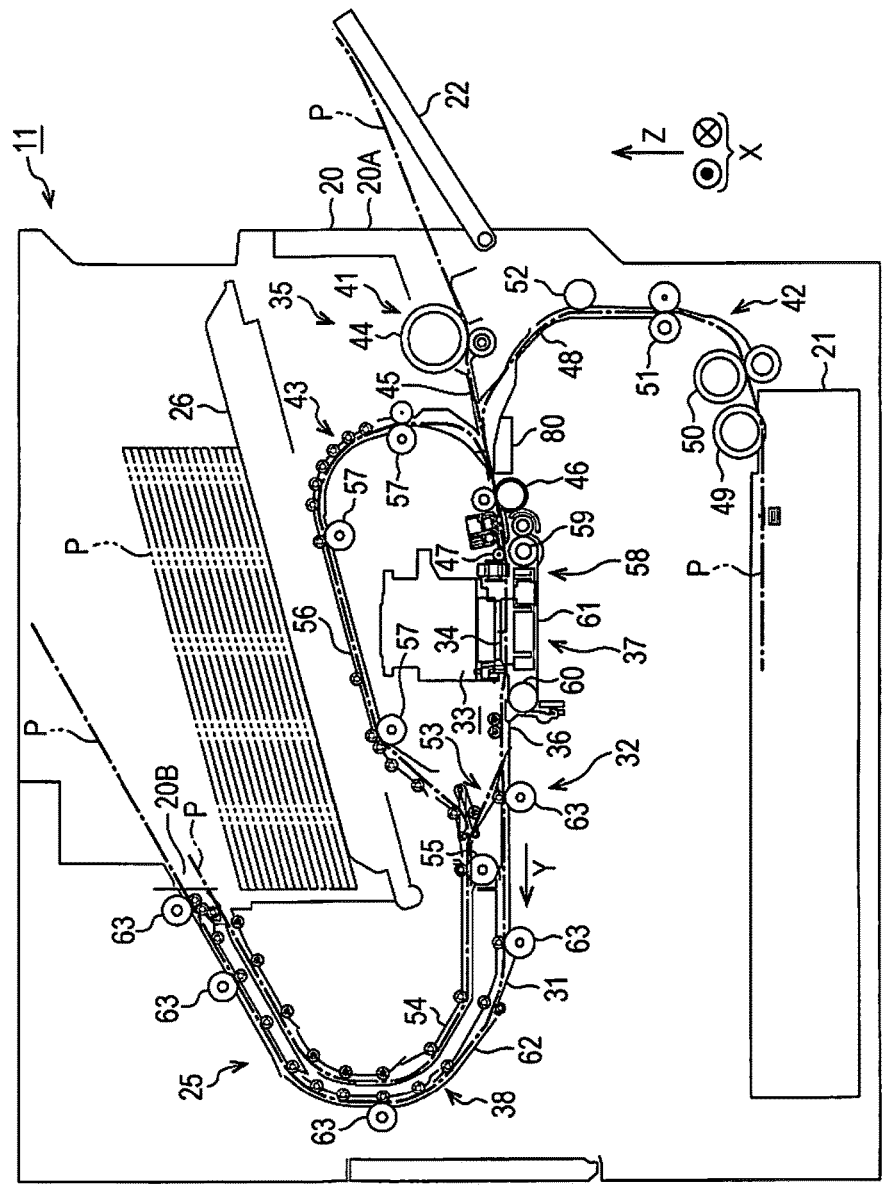
FIG. 1 is a cross-sectional view schematically illustrating a printing device.

FIG. 1 schematically illustrates a configuration of a part of a printing device 11 according to this embodiment in a body casing 20, for example. The printing device 11 is a type of a printer. Alternatively, the printing device 11 may be a multifunctional device having multiple functions of, for example, a scanner and a facsimile as well as the function of a printer. The printing device 11 may also be called a recording device or a liquid ejection (injection) device, for example. The entire or a part of the printing device 11 may also be called a print control device, for example. The printing device 11 is an example of a main body of executing a medium width detecting method.

As illustrated in FIG. 1, a printing mechanism unit 25 is provided in the body casing 20. The printing mechanism unit 25 includes a transport unit 32 as an example of a transport unit that transports a medium P along a transport path 31, and a printing unit 33 including a print head 34 for printing on the medium P that is being transported. Reference character Y represents a direction in which the medium P is transported in printing with the print head 34 (transport direction). Reference character X represents a width direction that is a direction intersecting (especially orthogonal to) the transport direction Y. Reference character Z represents a vertical direction.

The print head 34 employs an ink jet method of ejecting ink. The print head 34 is an elongated line head that is longer in the width direction X orthogonal the sheet surface in FIG. 1 than in the maximum width of the medium P, and is fixed at a predetermined location so that the print head 34 cannot move in the width direction X. This embodiment employs a line printing method in which ink droplets are ejected at a time from the fixed line head (print head 34) onto a range extending in the width direction X on the medium P that is being transported so that printing proceeds in line. The ink ejected from the print head 34 is attached to the medium P so that an image or a document, for example, is printed on the medium P. A serial printing method may also be employed, where the printing unit 33 includes a printing carriage movable in the width direction X, and the print head 34 provided in the printing carriage moves in the width direction X (main scanning direction) together with the printing carriage so that a transport operation of the medium P and a printing operation by the print head 34 are alternately performed.

The transport unit 32 includes a feeding mechanism unit 35 that feeds the medium P from a predetermined transport source, a transport mechanism unit 37 that transports the medium P along a transport path 36 for printing by the printing unit 33, and a delivery mechanism unit 38 that transports the printed medium P to a stacker unit 26 along a delivery path 62. The "feed" refers to the process of transporting the medium P from the predetermined transport source toward the printing unit 33. The feeding mechanism unit 35 includes a first feeding unit 41 using a paper feed tray 22 as a transport source, a second feeding unit 42 using a cassette 21 as a transport source, and a third feeding unit 43 that feeds the medium P printed on one side to the transport path 36 again for duplex printing. The first feeding unit 41 feeds the medium P placed on the paper feed tray 22 with its front end inserted from an insertion opening 20A, to the transport mechanism unit 37 along a first feeding path 45 by rotation of a first feeding roller pair 44. The paper feed tray 22 is disposed upstream of the print head 34 of the body casing 20 in the transport direction Y so that the paper feed tray 22 can open or close. The paper feed tray 22 is also called a manual feed tray or a multi purpose (MP) tray, for example.

The second feeding unit 42 feeds the medium P from the cassette 21 to the transport mechanism unit 37 along the second feeding path 48. The second feeding unit 42 includes a pickup roller 49 for sending an uppermost medium P in the cassette 21, a separation roller pair 50 for separating received media P into single sheets, and a second feeding roller pair 51 and a follower roller 52 that feed each separated single medium P. The user can draw the cassette 21 from the body casing 20 and place the cassette 21 in the body casing 20 again. Although FIG. 1 illustrates only one cassette 21, the printing device 11 may be equipped with a plurality of cassettes 21.

The transport mechanism unit 37 includes a transport roller pair 46 disposed downstream of a junction of the first feeding path 45, the second feeding path 48, and a reverse feeding path 56 described later in the transport direction Y, and a belt transport mechanism 58 disposed at a location facing the print head 34. The medium P is subjected to a skew correction in a feeding process by abutting the front edge of the medium P on the transport roller pair 46 that is stopped. The medium P subjected to the skew correction is transported to the transport path 36 by rotation of the transport roller pair 46. The skew correction refers to a process for eliminating a tilt of the medium P by applying rotation of the rollers onto the medium P with the front edge of the medium P stopped.

The belt transport mechanism 58 includes a pair of rollers 59 and 60 and a transport belt 61 wound around the pair of rollers 59 and 60. A transport follower roller 47 that contacts the transport belt 61 and follows the transport belt 61 is disposed above the roller 59 of the belt transport mechanism 58. The belt transport mechanism 58 employs an electrostatic attraction method that causes the medium P to be attracted on the surface of the charged transport belt 61 by static electricity. The print head 34 ejects ink toward the medium P that is being transported by the belt transport mechanism 58 at a constant speed with a uniform gap maintained between the medium P and the print head 34, thereby printing an image or a document, for example, on the medium P.

In duplex printing, the third feeding unit 43 flips over the medium P whose one side (surface) has been printed and feeds the flipped medium P to the transport mechanism unit 37 again. The medium P having one printed side and delivered from the transport mechanism unit 37 is guided to a branched transport path 54 by a branching mechanism 53, and by backward rotation after forward rotation of the transport roller pair 55, the medium P is guided to the reverse feeding path 56 disposed above the printing unit 33. Rotation of reverse transport roller pairs 57 causes the medium P to be fed along the reverse feeding path 56 and joined to the first feeding path 45 and the second feeding path 48 in a reversed state, and then to be guided to the transport mechanism unit 37 again so that the print head 34 prints the other unprinted side of the reversed medium P. In this manner, duplex printing is performed.

The delivery mechanism unit 38 delivers the printed medium P from a medium delivery port 20B onto the stacker unit 26 as indicated by a chain double-dashed line in FIG. 1 by rotation of a plurality of delivery roller pairs 63 disposed along the delivery path 62. The delivered printed medium P is stacked on the stacker unit 26.

As illustrated in FIG. 1, a medium detecting device 80 is disposed slightly upstream of the transport roller pair 46 disposed upstream of the print head 34 in the transport direction Y. The medium detecting device 80 is disposed downstream a location near the junction of the first feeding path 45, the second feeding path 48, and the reverse feeding path 56. The upper surface of the medium detecting device 80 also serves as parts of the first feeding path 45 and the second feeding path 48. The medium detecting device 80 can detect an edge (side edge) in the width direction X of the medium P fed by the first feeding unit 41 and the second feeding unit 42. Based on information obtained from the medium detecting device 80, the printing device 11 can detect the length in the width direction X of the medium P (medium width), for example.

Figure 2:
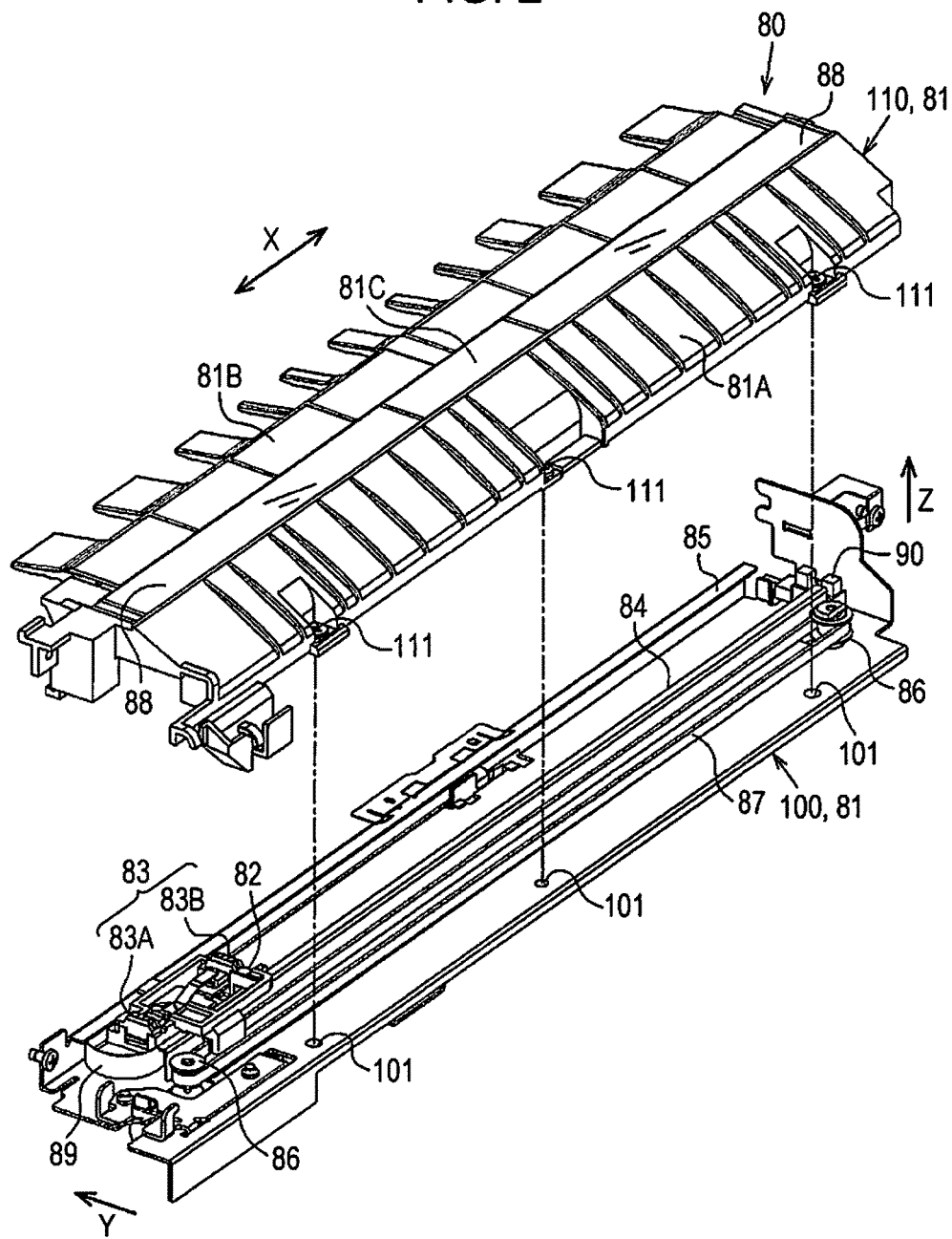
FIG. 2 is a disassembled perspective view illustrating a medium detecting device.

FIG. 2 is a disassembled perspective view illustrating the medium detecting device 80.

Figure 3:
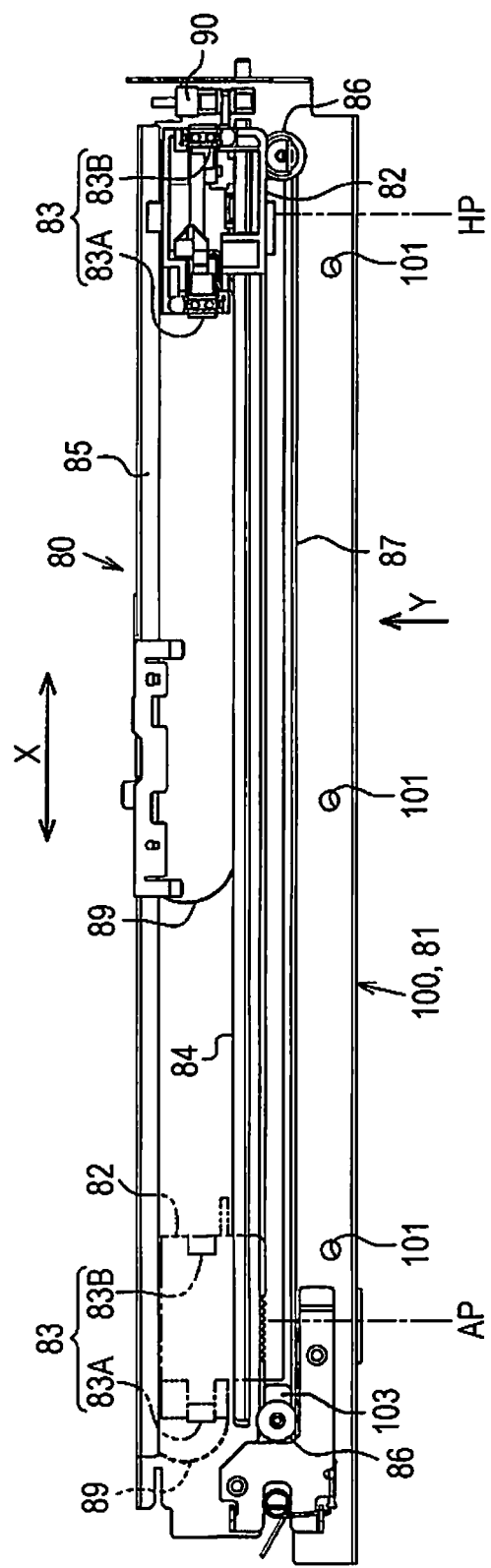
FIG. 3 is a plan view illustrating a state in which a cover is detached from the medium detecting device.

FIG. 3 is a plan view illustrating a state in which a cover 110 is detached from the medium detecting device 80 when viewed from above.

A casing 81 of the medium detecting device 80 is elongated in the width direction X, and is constituted by a base 100, and a cover 110 that covers the base 100 from above when assembled to the base 100. The width direction X may be referred to as a longitudinal direction of the medium detecting device 80. While supporting the medium P that is being fed (transported) on the upper surface of the medium detecting device 80, the medium detecting device 80 reads the medium P in the width direction X through windows 88 provided in the upper surface of the medium detecting device 80 to detect a side edge of the medium P. The upper surface of the medium detecting device 80 is constituted by the cover 110. The cover 110 has, in an upstream portion (a portion upstream of the windows 88) in the transport direction Y, a sloped medium guide part 81A that guides the medium P that is being fed in the second feeding path 48. The cover 110 also has, in a downstream portion in the transport direction Y, a substantially horizontal medium supporting part 81B for supporting the medium P that is being fed in the first feeding path 45 or the second feeding path 48. The windows 88 are also a part of the medium supporting part 81B.

The casing 81 houses a carriage 82 that can move along the width direction X. The carriage 82 incorporates a plurality of sensors 83. Specifically, the sensors 83 are a sensor 83A and a sensor 83B that are disposed at difference locations in the width direction X. The sensor 83A may be referred to as a first sensor 83A, and the sensor 83B may be referred to as a second sensor 83B. The casing 81 includes an electric motor 103 (see FIG. 4) as an example of a power source for causing the carriage 82 to move. The electric motor 103 is disposed below the base 100. In the casing 81, a pair of parallel rail units 84 and 85 for guiding the carriage 82 so that the carriage 82 can move along the width direction X is provided. The carriage 82 is fixed to an portion of an endless belt 87 wound around a pair of pulleys 86 separated from each other in the width direction X.

The medium detecting device 80 employs a belt driving method that causes the carriage 82 to reciprocate in the width direction X by rotation of the pulleys 86 and the belt 87 caused by power of the electric motor 103. The electric motor 103 is coupled to one of the pulleys 86 (the pulley 86 closer to an away position AP described later in the example of FIG. 3), and causes the pulley 86 to rotate. The electric motor 103 is a stepping motor. As described above, since the medium detecting device 80 is provided as a separate component from the print head 34, the carriage 82 and the sensors 83 can move in the width direction X, independently of the print head 34. As clearly shown in the configuration illustrated in FIG. 1, the carriage 82 can move in the width direction X at a location upstream of the print head 34 in the transport direction Y.

In the cover 110, the windows 88 are disposed at positions facing the detection sides of the sensors 83 while the carriage 82 moves. The windows 88 are made of, for example, an optically transparent member such as transparent glass or transparent plastic. The sensors 83 are optical sensors, and optically read the medium P through the windows 88 to thereby detect a side edge of the medium P. In the example illustrated in FIG. 2, two windows 88 are disposed along the width direction X. In the printing device 11, center feeding is performed in such a manner that the center of the medium P in the width direction X passes through the centers of the feeding paths 45 and 48 in the width direction X, independently of the size of the medium P. A substantially horizontal support unit 81C is interposed between the two windows 88 at a location corresponding to the centers of the feeding paths 45 and 48 in the width direction X. The support unit 81C is also a part of the medium supporting part 81B. The cover 110 may not include the support unit 81C, that is, the support unit 81C may be replaced by the windows 88.

The carriage 82 and a longitudinal center portion of the upper surface of the base 100 are connected to each other by a flexible flat cable 89. A position sensor 90 for detecting that the carriage 82 is at an end (home position HP) of a movable range (movable range of the carriage 82) in the width direction X is provided at a longitudinal end of the upper surface of the base 100. The position sensor 90 outputs detection signals SH (see FIGS. 8 and 9) that are different between the case where the carriage 82 is at the home position HP and the case where the carriage 82 is not at the home position HP. As illustrated in FIG. 3, the carriage 82 can move between the home position HP indicated by a solid line and the away position AP that is located at an opposite end to the home position HP in the width direction X and indicated by a chain double-dashed line. As clearly shown in FIG. 3, the sensor 83 located forward in movement of the carriage 82 from the home position HP to the away position AP is the sensor 83A of the sensors 83A and 83B, and the sensor 83 located forward in movement of the carriage 82 from the away position AP to the home position HP is the sensor 83B.

An end of the flexible flat cable 89 is fixed to a longitudinal center of a peripheral portion of the base 100. The flexible flat cable 89 extends from the fixed end thereof along one rail unit 85, then is curved at a halfway point, and then extends along the other rail unit 84 to have the other end thereof connected to the carriage 82. With movement of the carriage 82, the curved portion of the flexible flat cable 89 moves in the width direction X so that electrical connection to the moving carriage 82 is maintained. A plurality of screw holes 101 are formed in a peripheral portion of the base 100 at appropriate intervals along the periphery. In a peripheral portion of the cover 110, screws 111 inserted in unillustrated screw insertion holes formed at locations corresponding to the screw holes 101 are screwed into the corresponding screw holes 101 in the base 100 so that the base 100 and the cover 110 are assembled, thereby forming a casing 81.

Each of the two sensors 83A and 83B includes a light-emitting part and a light-receiving part. The light-receiving part of the sensor 83A receives reflected light from light emitted from the light-emitting part of the sensor 83A so that the sensor 83A outputs a detection signal SA (see FIGS. 8 and 9) at a voltage level in accordance with the amount of the received light. Similarly, the light-receiving part of the sensor 83B receives reflected light from light emitted from the light-emitting part of the sensor 83B so that the sensor 83B outputs a detection signal SB (see FIGS. 8 and 9) at a voltage level in accordance with the amount of the received light. For example, the sensors 83A and 83B output a low (L) level as detection signals SA and SB if the voltage value in accordance with the amount of received light is a predetermined threshold or less, and output a high (H) level as detection signals SA and SB if the voltage value in accordance with the amount of received light of reflected light from the medium P exceeds the predetermined threshold. That is, in this example, the sensors 83A and 83B output the L level when not detecting the medium P, and output the H level when detecting the medium P. In either case, the sensors 83A and 83B output detection signals SA and SB at different voltage levels between the case of not detecting the medium P and the case of detecting the medium P.

Figure 4:
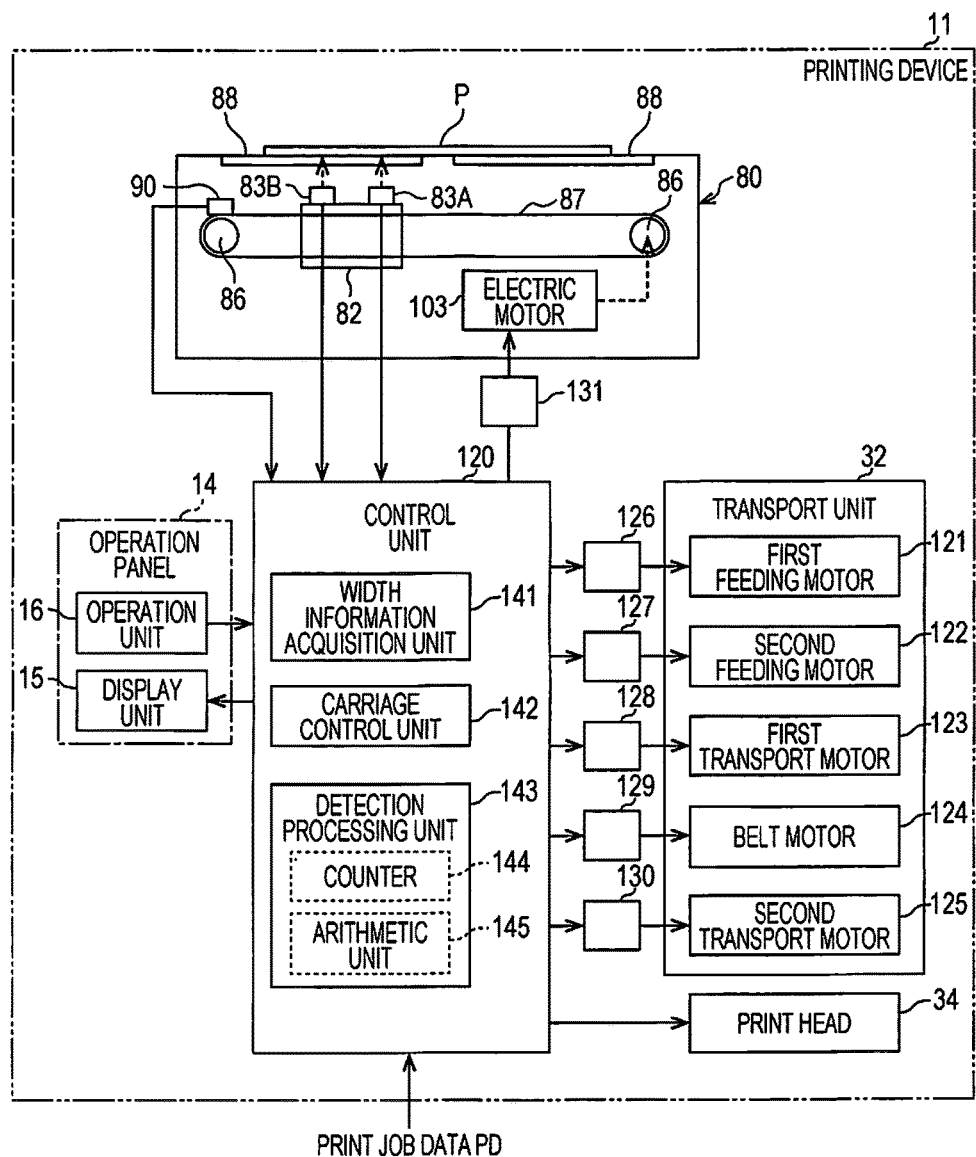
FIG. 4 is a block diagram illustrating an electrical configuration of the printing device.

The electrical configuration of the printing device 11 will now be described with reference to FIG. 4.

The printing device 11 includes a control unit 120 that controls components of the printing device 11 as a whole, the medium detecting device 80, an operation panel 14, the transport unit 32, and the print head 34. The transport unit 32 includes a first feeding motor 121 serving as a power source of the first feeding unit 41 for feeding the medium P set on the paper feed tray 22 and a second feeding motor 122 serving as a power source of the second feeding unit 42 for feeding the medium P set in the cassette 21, for example. The transport unit 32 includes a first transport motor 123 serving as a power source of, for example, the transport roller pair 46 for transporting the fed medium P and the delivery mechanism unit 38, a belt motor 124 serving as a power source of the belt transport mechanism 58, and a second transport motor 125 serving as a power source of the transport roller pair 55 for transporting the medium P having one printed side and the reverse transport roller pair 57, for example. The control unit 120 is electrically connected to a plurality of motors 121 to 125 through motor driving circuits 126 to 130 in the same number as the number of motors of a transport system. The control unit 120 controls the motors 121 to 125 through the motor driving circuits 126 to 130 to thereby perform feeding, transport, reversing in duplex printing, and delivery of the medium P.

The print head 34 is electrically connected to the control unit 120. The control unit 120 controls the print head 34 based on print image data in print job data PD received from a host device (not shown), for example, so that ink droplets are ejected from a nozzle of the print head 34 onto a portion of the medium P being transported located above the transport belt 61, thereby printing an image, for example, based on the print image data on the medium P. The control unit 120 is electrically connected to the operation unit 16 and the display unit 15 constituting the operation panel 14. The operation unit 16 corresponds to physical buttons or a touch panel displayed on the display unit 15, for example. Based on an operation signal input from the operation unit 16, the control unit 120 accepts various settings and instructions such as start of printing, scanning, or copying depending on an item selected from a menu displayed on the display unit 15.

The control unit 120 is electrically connected to the electric motor 103, the position sensor 90, the sensors 83 (the sensor 83A and the sensor 83B) on the carriage 82. The sensor 83A and the sensor 83B are connected to the control unit 120 through the flexible flat cable 89 described above. The control unit 120 receives the detection signals SA and SB from the sensors 83A and 83B, and receives the detection signal SH from the position sensor 90. The control unit 120 controls driving of the electric motor 103 through the motor driving circuit 131 to thereby perform control movement of the carriage 82 in the width direction X.

The control unit 120 includes a plurality of functional units each of which includes, for example, an unillustrated CPU and an unillustrated memory and functions by execution, by the CPU, of a program stored in the memory. The control unit 120 includes, as the functional units, a width information acquisition unit 141 that acquires width information of the medium P, a carriage control unit 142 that specifies the number of steps and controls driving of the electric motor 103 through the motor driving circuit 131, and a detection processing unit 143 that can detect a medium width of the medium P based on the detection signals SA and SB of the sensors 83A and 83B.

The width information acquisition unit 141 acquires the value of the medium width from print setting information included in the print job data PD received by the control unit 120. The print setting information includes size information (e.g., size information of A4 size, letter size, A3 size, etc.) of the medium P to be used for printing based on the print job data PD. For example, the memory stores reference data showing a correspondence between the size of the medium P and the medium width, and based on the size of the medium P obtained from the print setting information, the width information acquisition unit 141 acquires the medium width with reference to the reference data. The medium width acquired by the width information acquisition unit 141 will be hereinafter referred to as a setting medium width.

The carriage control unit 142 supplies a step control signal that varies depending on a mode (excitation mode) to the motor driving circuit 131 so that the electric motor 103 can be driven in one of a plurality of modes. The electric motor 103 may be, for example, a 96-pole PM stepping motor. In this case, the electric motor 103 makes one turn of a rotor in 96 steps. A mode in which one turn of the rotor of the electric motor 103 is made in 96 steps as described above is called a full step (2-phase excitation) mode. A mode in which one turn of the rotor of the electric motor 103 is made in the number of steps twice as large as that in the full step mode is called a half step (1-2-phase excitation) mode. In addition, a mode in which one turn of the rotor of the electric motor 103 is made in a larger number of steps is called a micro step mode. The micro step mode includes modes (W1-2-phase excitation, 2W1-2-phase excitation, 4W1-2-phase excitation modes) in which one turn of the rotor of the electric motor 103 is made in the numbers of steps four times, eight times, and sixteenth times, respectively, as large as that in the full step mode.

For an example, suppose each of the pulleys 86 has a diameter of 8.91 mm. Then, the travel distance (travel amount in one step) of the carriage 82 in the width direction X per one step of the electric motor 103 in the full step mode is a value obtained by dividing, by 96 steps, a value obtained by multiplying 8.91 mm by a circular constant, that is, is about 0.292 mm. Of course, in the half step mode or each micro step mode, the one-step travel amounts are short, such as ½, ¼, ⅛, and 1/16 of the 0.292 mm. That is, the control unit 120 (carriage control unit 142) causes the motor driving circuit 131 to drive the electric motor 103 in different modes so that the location of the carriage 82 can be changed with different one-step travel amounts (different resolutions).

In this embodiment, the control unit 120 (carriage control unit 142) can selectively perform a first movement control of changing the location of the carriage 82 with a first resolution and a second movement control of changing the location of the carriage 82 with a second resolution higher than the first resolution.

The first movement control is, for example, a movement control of the carriage 82 performed by driving the electric motor 103 in the full step mode. The second movement control is, for example, a movement control of the carriage 82 performed by driving the electric motor 103 in a specific micro step mode (e.g., a 2W1-2-phase excitation mode). In this case, the resolution of the second movement control is eight times as high as that of the first movement control. That is, suppose the one-step travel amount by the first movement control is 0.292 mm, the one-step travel amount by the second movement control is about 0.0365 mm, which is ⅛ of the resolution of the first movement control.

The detection processing unit 143 includes a counter 144 that counts the number of steps of the electric motor 103 based on the detection signals SA and SB of the sensors 83A and 83B, and an arithmetic unit 145 that calculates a medium width based on the count result by the counter 144 or the one-step travel amount.

Figure 5:
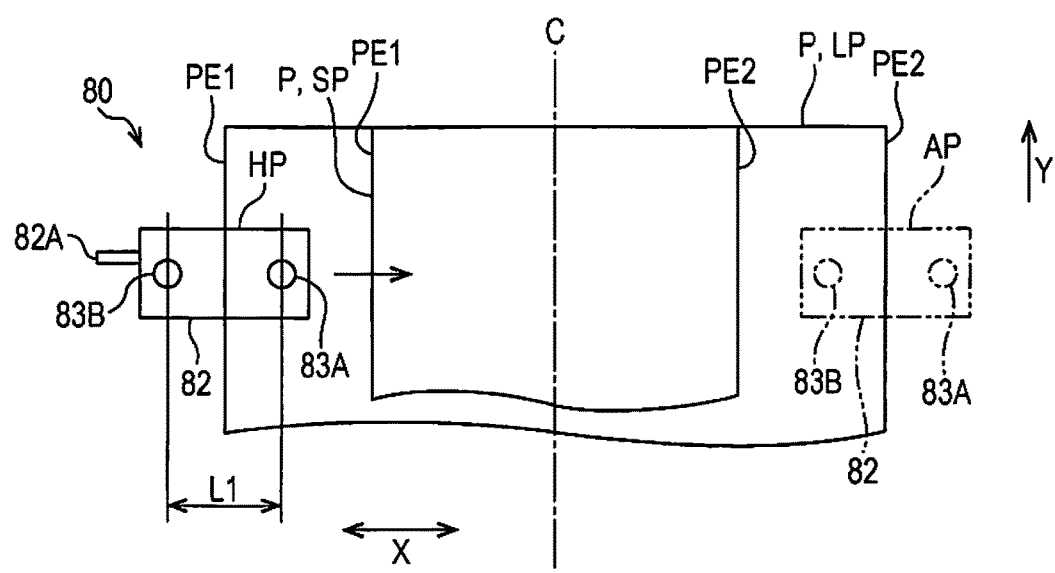
FIG. 5 is a plan view schematically illustrating a process of detecting a side edge of a medium.

FIG. 5 is a schematic view illustrating a process of detecting a side edge of the medium P by the sensors 83A and 83B, when viewed from the back surface of the medium P. Although each of the sensors 83A and 83B includes the light-emitting part and the light-receiving part as described above, FIG. 5 simply illustrates each of the sensors 83A and 83B as a circle. As illustrated in FIG. 5, the sensor 83A and the sensor 83B are mounted on top of the carriage 82 with the centers thereof spaced from each other at an inter-center distance L1 in the width direction X. The inter-center distance L1 is a value determined based on design of the medium detecting device 80.

In this embodiment, in a case where a detection target is a medium P of a size whose medium width exceeds a predetermined threshold of the medium width (large-size medium) among media P of sizes capable of being transported by the transport unit 32, one sensor 83 of the sensors 83A and 83B detects the medium P while the carriage 82 is at an end (the home position HP or the away position AP) in a movable range. On the other hand, in a case where the detection target is a medium P of a size whose width is the predetermined threshold of the medium width or less (small-size medium), none of the sensors 83A and 83B detects the medium P while the carriage 82 is at the end (the home position HP or the away position AP). A medium LP illustrated in FIG. 5 is a type of the large-size medium, and a medium SP illustrated in FIG. 5 is a type of the small-size medium. The predetermined threshold of the medium width is a value determined based on the design of the medium detecting device 80.

Referring to the example of FIG. 5, when the carriage 82 is at the home position HP (see the carriage 82 indicated by the solid line in FIG. 5), the sensor 83A of the sensors 83A and 83B that is closer to a center C (i.e., the center of the feeding paths 45 and 48 in the width direction X) of the movable range of the carriage 82 detects the medium LP, and the sensor 83B away from the center C does not detect the medium LP. When the carriage 82 is at the away position AP (see the carriage 82 indicated by the chain double-dashed line in FIG. 5), the sensor 83B of the sensors 83A and 83B that is closer to the center C detects the medium LP, and the sensor 83A away from the center C does not detect the medium LP. On the other hand, in a case where the medium P is the medium SP, none of the sensors 83A and 83B detects the medium SP independently of whether the carriage 82 is at the home position HP or the away position AP. As described above, the movable range of the carriage 82 is relatively narrow as compared to the maximum width of the medium P that can be transported by the transport unit 32. That is, in this embodiment, the dimension of the medium detecting device 80 in the width direction X is relatively small for the maximum width, and the dimension of the printing device 11 in the width direction X is relatively small.

Reference character 82A in FIG. 5 denotes a projection of the carriage 82 projecting toward the home position HP. The position sensor 90 can detect the projection 82A. That is, in the case of detecting the projection 82A, the position sensor 90 outputs a detection signal SH at a predetermined level (e.g., H level) indicating that the carriage 82 is at the home position HP, and in the case of not detecting the projection 82A, the position sensor 90 outputs a detection signal SH at a predetermined level (e.g., L level) indicating that the carriage 82 is not at the home position HP. In this case, if the detection signal SH input from the position sensor 90 is at the H level, the control unit 120 recognizes that the carriage 82 is at the home position HP, whereas if the detection signal SH is at the L level, the control unit 120 recognizes that the carriage 82 is not at the home position HP.

Figure 6:
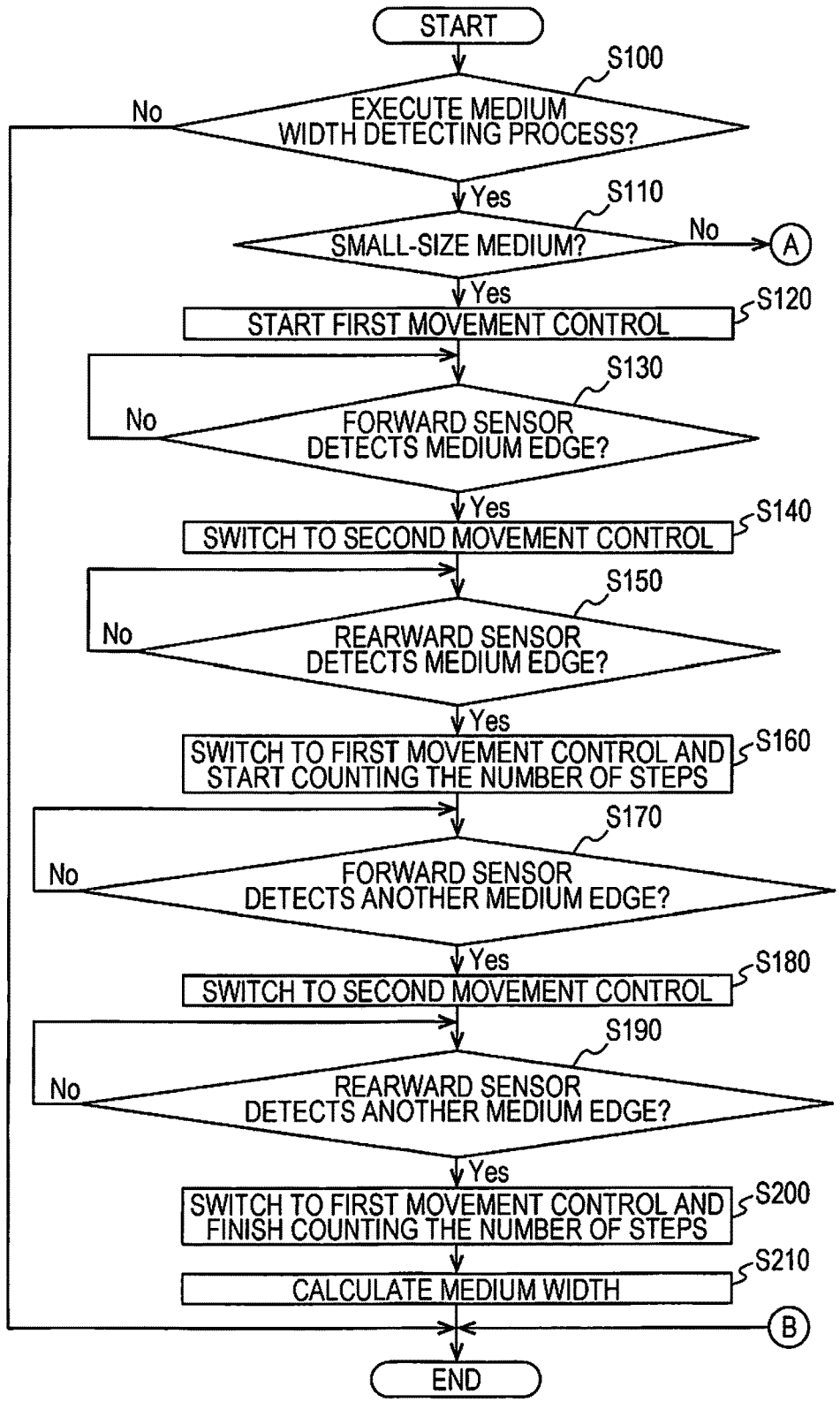
FIG. 6 is a flowchart depicting a medium width detection process (including a small-size medium width detection process).
Figure 7:
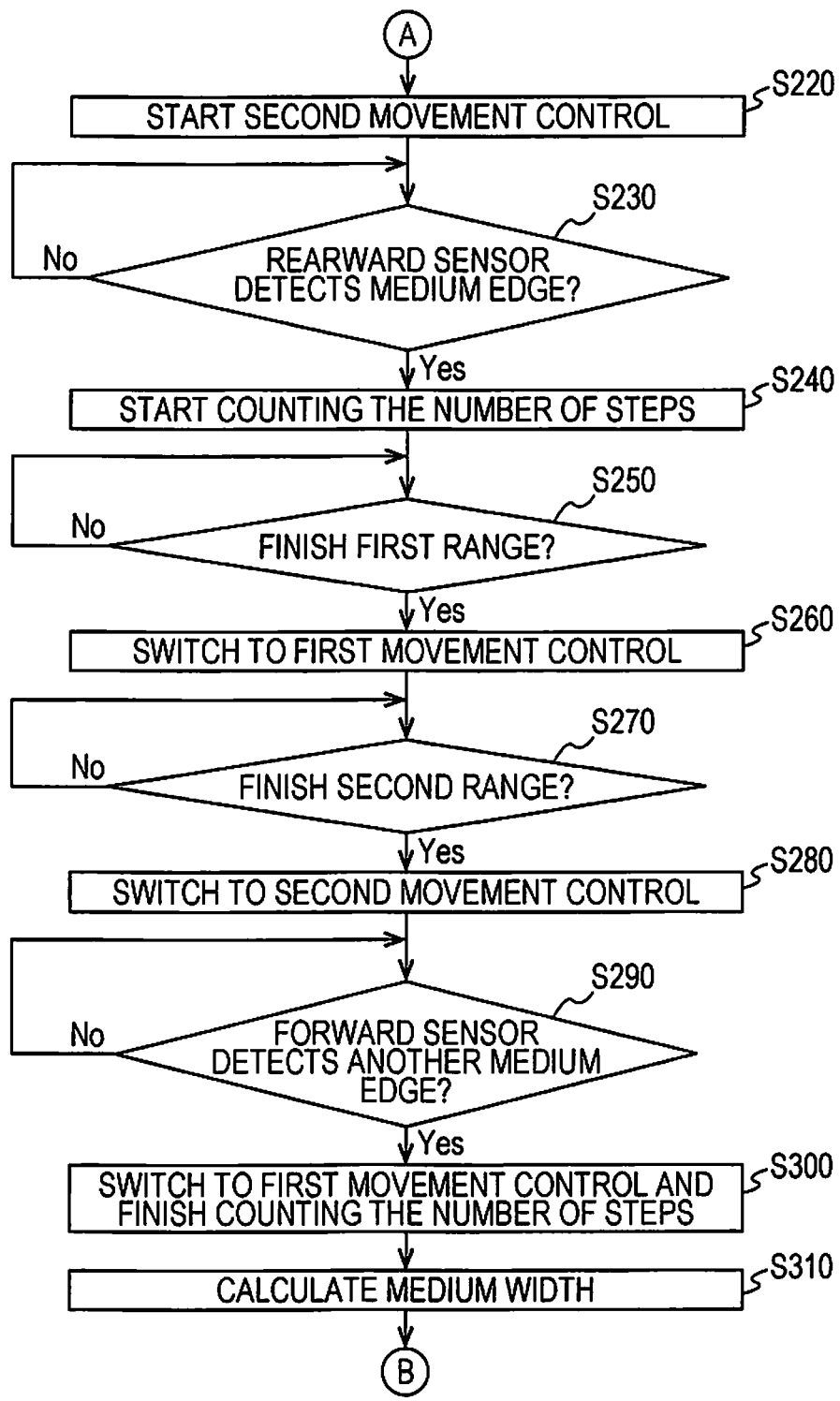
FIG. 7 is a flowchart depicting a medium width detection process (large-size medium width detection process).

FIGS. 6 and 7 show the medium width detection process performed by the control unit 120 in flowcharts. The control unit 120 can start the flowcharts in response to the start of a single medium P from a predetermined transport source (the cassette 21 or the paper feed tray 22) of the medium P upon reception of the print job data PD.

In step S100, the control unit 120 determines whether to perform a medium width detection process on a medium P that is currently a target of feeding. If it is determined that the medium width detection process is to be executed, "Yes" is selected, and the process proceeds to step S110. If it is determined that the medium width detection process is not to be executed, "No" is selected, and the flowchart (medium width detection process) is finished. Criteria for the determination in step S100 will be described later.

After the medium width detection process has been finished, the control unit 120 continues to control the transport unit 32 to continue feeding and transport of the medium P, and controls the print head 34 as described above to perform printing on the medium P based on the print job data PD (print image data).

In step S110, the control unit 120 determines whether the medium P as a target of the medium width detection process is a small-size medium or not. If the medium P is a small-size medium, "Yes" is selected, and the process proceeds to step S120. On the other hand, if the medium P is not a small-size medium (i.e., is a large-size medium), "No" is selected, and the process proceeds to step S220 (see FIG. 7). The determination in step S110 can be performed based on the setting medium width obtained by the width information acquisition unit 141, for example. That is, the control unit 120 compares the setting medium width with a predetermined threshold concerning the medium width. If the setting medium width is less than or equal to the predetermined threshold concerning the medium width, the medium P can be assumed to be a small-size medium, and thus, the process proceeds to step S120. If the setting medium width is larger than the predetermined threshold concerning the medium width, the medium P can be assumed to be a large-size medium, and thus, the process proceeds to step S220.

Alternatively, the control unit 120 may perform the determination in step S110 based on detection signals from the sensors 83. The control unit 120 refers to a detection signal from one of the sensors 83A and 83B closer to the center C.

In this embodiment, the carriage 82 remains at the home position HP at the timings of steps S100 and S110. At the timing of S110, the medium P as a target of the medium width detection process is present on the medium detecting device 80 (e.g., in a state immediately before the front edge of the medium P abuts on the transport roller pair 46 that is not moving. Thus, in step S110, the control unit 120 refers to the detection signal SA of the sensor 83A closer to the center C. If the detection signal SA is at the L level, the medium P is a small-size medium, and the process proceeds to step S120. If the detection signal SA is at the H level, the medium P is a large-size medium, and the process proceeds to step S220.

Here, processes subsequent to step S120 in FIG. 6 will be described first, and processes subsequent to step S220 will then be described with reference to FIG. 7. Steps S120 to S210 will also be referred to as a small-size medium width detection process. Steps S220 to S310 will also be referred to as a large-size medium width detection process.

Figure 8:
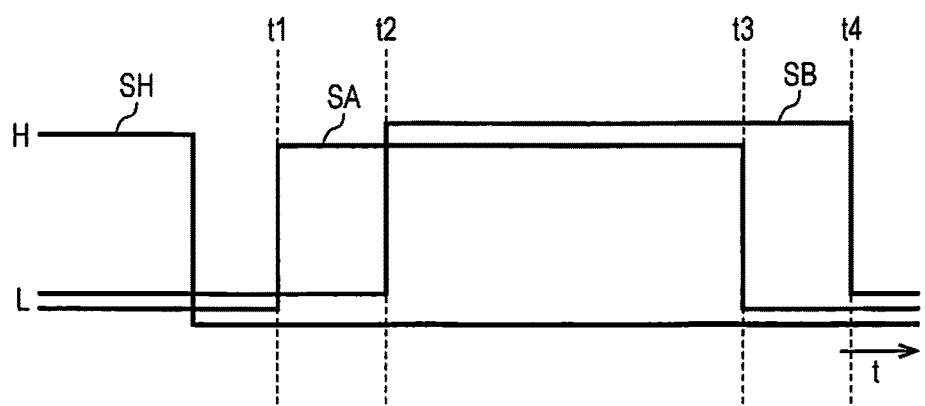
FIG. 8 is a graph showing detection signals associated with the small-size medium width detection process.

FIG. 8 shows changes of the detection signals SA, SB, and SH input from the sensors 83A, 83B, and 90 associated with the small-size medium width detection process. In FIG. 8, the abscissa represents the time t, and the ordinate represents voltage levels of the detection signals SA, SB, and SH.

In step S120, the control unit 120 (carriage control unit 142) sends a step control signal to the motor driving circuit 131 to thereby start movement of the carriage 82 under the first movement control, specifically, movement from the home position HP toward the away position AP in this example. With the start of such movement of the carriage 82, the detection signal SH of the position sensor 90 changes from the H level to the L level (see FIG. 8).

Next, the control unit 120 determines whether the sensor 83 located forward in movement between the sensors 83A and 83B, that is, the sensor 83A in this case, has detected an edge (first edge) of the medium P or not (step S130). Referring to the example of FIG. 5, when the carriage 82 starts moving from the home position HP, the sensor 83A located forward in movement first passes under a side edge PE1 of the medium P (medium SP). At this time, the detection signal SA of the sensor 83A rises from the L level to the H level (see reference character t1 in FIG. 8). Accordingly, at timing t1 when the control unit 120 recognizes that the input detection signal SA of the sensor 83A rises from the L level to the H level, the control unit 120 selects "Yes" in step S130, and the process proceeds to step S140.

In step S140, the control unit 120 (carriage control unit 142) sends a step control signal to the motor driving circuit 131 to thereby switch from the first movement control to the second movement control, and continues movement of the carriage 82.

Thereafter, the control unit 120 determines whether the sensor 83 located rearward in movement between the sensors 83A and 83B, that is, the sensor 83B in this case, has detected the edge of the medium P or not (step S150). Referring to the example of FIG. 5, after the carriage 82 has started moving from the home position HP and the sensor 83A has passed under the side edge PE1 of the medium P (medium SP), the sensor 83B passes under the side edge PE1 of the medium P (medium SP). At this time, the detection signal SB of the sensor 83B rises from the L level to the H level (see reference character t2 in FIG. 8). Accordingly, at timing t2 when the control unit 120 recognizes that the input detection signal SB of the sensor 83B rises from the L level to the H level, the control unit 120 selects "Yes" in step S150, and the process proceeds to step S160.

In step S160, the control unit 120 (carriage control unit 142) sends a step control signal to the motor driving circuit 131 to thereby switch from the second movement control to the first movement control, and continues movement of the carriage 82. In addition, in step S160, the control unit 120 (the counter 144 of the detection processing unit 143) starts counting the number of steps of the electric motor 103.

Subsequently, the control unit 120 determines whether the sensor 83A located forward in movement has detected the other edge (second edge) of the medium P or not (step S170). Referring to the example of FIG. 5, after the carriage 82 has started moving from the home position HP and the sensor 83B has passed under the side edge PE1 of the medium P (medium SP), the sensor 83A passes under a side edge PE2 of the medium P (medium SP). At this time, the detection signal SA of the sensor 83A falls from the H level to the L level (see reference character t3 in FIG. 8). Accordingly, at timing t3 when the control unit 120 recognizes that the input detection signal SA of the sensor 83A falls from the H level to the L level, the control unit 120 selects "Yes" in step S170, and the process proceeds to step S180.

In the example of FIG. 2, the cover 110 of the medium detecting device 80 includes a support unit 81C between the window 88 and the window 88. Since the medium P cannot be detected while the sensors 83A and 83B pass under the support unit 81C, the detection signals SA and SB of the sensors 83A and 83B that are mounted on the carriage 82 and moves in the casing 81 of the medium detecting device 80 are temporarily out of the H level. In this embodiment, however, the position and size of the support unit 81C are previously determined, and the side edges PE1 and PE2 of the medium P do not pass above the support unit 81C. Thus, changes of the detection signals SA and SB caused by the support unit 81C are negligible in this description.

In step S180, the control unit 120 (carriage control unit 142) sends a step control signal to the motor driving circuit 131 to thereby switch from the first movement control to the second movement control, and continues movement of the carriage 82.

Subsequently, the control unit 120 determines whether the sensor 83B located rearward in movement has detected the other edge of the medium P or not (step S190). Referring to the example of FIG. 5, after the carriage 82 has started moving from the home position HP and the sensor 83A has passed under the side edge PE2 of the medium P (medium SP), the sensor 83B passes under the side edge PE2 of the medium P (medium SP). At this time, the detection signal SB of the sensor 83B falls from the H level to the L level (see reference character t4 in FIG. 8). Accordingly, at timing t4 when the control unit 120 recognizes that the detection signal SB of the sensor 83B falls from the H level to the L level, the control unit 120 selects "Yes" in step S190, and the process proceeds to step S200.

In step S200, the control unit 120 (carriage control unit 142) sends a step control signal to the motor driving circuit 131 to thereby switch from the second movement control to the first movement control, and continues movement of the carriage 82. Thereafter, the control unit 120 may stop the carriage 82 at the away position AP or may return the carriage 82 to the home position HP. In addition, in step S200, the control unit 120 (the counter 144 of the detection processing unit 143) finishes counting the number of steps of the electric motor 103 started in step S160.

In step S210, the control unit 120 (the arithmetic unit 145 of the detection processing unit 143) calculates the medium width of the medium P (medium SP) based on the number of steps of the electric motor 103 counted in the period of steps S160 to S200. The control unit 120 calculates the medium width (e.g., stores the calculated medium width in a predetermined storage region as necessary), and finishes the flowchart (medium width detection process). The number of steps of the electric motor 103 counted as described above is the number of steps corresponding to a period from when the sensor 83 (sensor 83B) located rearward in movement detects the side edge PE1 of the medium P to when the sensor 83 (sensor 83B) detects the side edge PE2. Thus, in step S210, the medium width is calculated based on detection results of the edge and the other edge of the medium P obtained by the sensor 83 located rearward in movement.

Figure 10A:
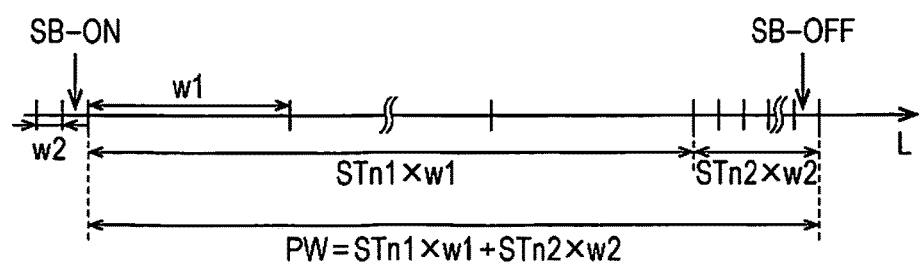
FIG. 10A is a view for describing how the medium width is calculated in the small-size medium width detection process.
Figure 10B:
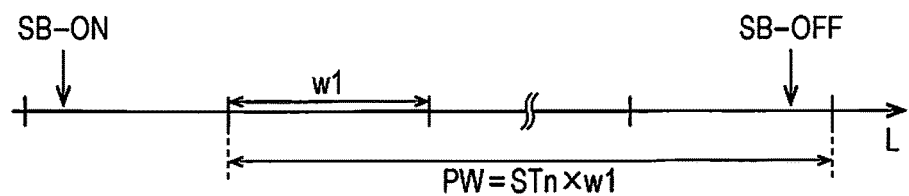
FIG. 10B shows a comparative example of FIG. 10A.

FIG. 10A is a view for describing a process of calculating a medium width performed by the arithmetic unit 145 in step S210. FIG. 10B shows a comparative example of FIG. 10A. In FIGS. 10A and 10B, L axis refers to a travel distance of the carriage 82 in the width direction X. The L axis is provided with a scale including markings at predetermined intervals, and each of such intervals w1 and w2 of the scale refers to a one-step travel amount. That is, the wider interval w1 in FIG. 10A is a one-step travel amount w1 under the first movement control, and the narrower interval w2 in FIG. 10A is a one-step travel amount w2 under the second movement control. The scale shown in FIG. 10B includes only the interval w1, that is, the one-step travel amount w1 under the first movement control. Of course, the interval w1 is larger than the interval w2, and in the examples of FIGS. 10A and 10B, w2 is ⅛ of w1.

Reference character SB-ON represents the position of the sensor 83B at the timing when the detection signal SB of the sensor 83B rises from the L level to the H level, that is, at timing t2 when the control unit 120 selects "Yes" in step S150. Reference character SB-OFF represents the position of the sensor 83B at the timing when the detection signal SB of the sensor 83B falls from the H level to the L level, that is, at timing t4 when the control unit 120 selects "Yes" in step S190. Accordingly, in FIGS. 10A and 10B, the distance from reference character SB-ON to reference character SB-OFF can be determined to correspond to an actual medium width of the medium P. In FIGS. 10A and 10B, the locations of reference characters SB-ON and SB-OFF are the same.

Reference character STn1 in FIG. 10A represents the number of steps counted in a period from when the control unit 120 starts counting the number of steps of the electric motor 103 in step S160 to when the control section 120 switches to the second movement control in step S180 (a period substantially corresponding to a period from timing t2 to timing t3). Reference character STn2 represents the number of steps counted in a period from when the control unit 120 switches to the second movement control in step S180 to when the control section 120 finishes counting the number of steps in step S200 (a period substantially corresponding to a period from timing t3 to timing t4). That is, the number of steps STn1 is the number of steps during movement under the first movement control in the number of steps of the electric motor 103 counted in the period of steps S160 to S200, and the number of steps STn2 is the number of steps during movement under the second movement control in the number of steps of the electric motor 103 counted in the period of steps S160 to S200.

Accordingly, in step S210, the control unit 120 calculates (detects) a medium width PW by the following Equation (1):

$$PW = STn1 \times w1 + STn2 \times w2 \qquad (1)$$

On the other hand, in the comparative example shown in FIG. 10B, switching between the first movement control and the second movement control as described in this embodiment is not performed, and the control unit 120 merely performs only the first movement control in order to move the carriage 82. Accordingly, in the case of this comparative example, the control unit 120 starts counting after one sensor 83 (e.g., the sensor 83A) of the carriage 82 has detected an edge (side edge PE1) of the medium P (medium SP). Based on the number of steps (the number of steps STn) of the electric motor 103 in a case where counting is finished after the sensor 83A has detected the other edge (side edge PE2) of the medium P (medium SP), a medium width PW is detected by the following Equation (2):

$$PW = STn \times w1 \qquad (2)$$

In either case of this embodiment (FIG. 10A) or the comparative example (FIG. 10B), the control unit 120 obtains movement and the location of the carriage 82 based on the number of steps of the electric motor 103. Since the detection signals SA and SB from the sensors 83A and 83B interrupt the control unit 120, the control section 120 starts or finishes counting the number of steps after recognizing changes of such detection signals SA and SB (a change from the L level to the H level and a change from the H level to the L level). Referring to FIGS. 10A and 10B, in actual application, a case where SB-ON coincides with any marking of the scale on the L axis and SB-OFF coincides with any marking of the scale on the L axis hardly occurs. Thus, the medium width PW based on the number of steps of the electric motor 103 counted by the control unit 120 has shifts including a shift corresponding to a one-step travel amount at maximum that can occur at the start of counting of the number of steps and a shift corresponding to a one-step travel amount at maximum that can occur at the end of counting of the number of steps (shifts of one-step travel amount×2 at maximum), as compared to an actual medium width of the medium P.

In addition, a shift due to light sensitivity and circuit characteristics of the sensors 83A and 83B incorporated in the carriage 82 can occur. Specifically, a slight time shift occurs between the time when the sensors 83A and 83B passes the side edges PE1 and PE2 of the medium P and the timing when the detection signals SA and SB from the sensors 83A and 83B change from the L level to the H level or from the H level to the L level. In consideration of such a time shift, the medium width PW obtained by calculation of the control unit 120 based on the number of steps of the electric motor 103 can include a shift of, for example, about one-step travel amount×4, significantly exceeding the shift of one-step travel amount×2 described above, as compared to an actual medium width of the medium P.

In view of situations where such a shift can occur, this embodiment (FIG. 10A) obtains a significantly higher detection accuracy of the medium width than the comparative example (FIG. 10B). As described above, in the small-size medium width detection process, in response to detection of the side edge PE1 or the side edge PE2 of the medium P (medium SP) by the sensors 83 (sensor 83A) located forward in movement, the control unit 120 switches the movement control of the carriage 82 from the first movement control to the second movement control having a high resolution (i.e., having a narrow one-step travel amount w2). In this manner, at the time when the sensors 83 (sensor 83B) located rearward in movement detects the side edge PE1 or the side edge PE2 of the medium P (medium SP), the movement control of the carriage 82 is the second movement control. Thus, even when a shift can occur between an actual medium width of the medium P and the medium width PW based on the number of steps of the electric motor 103 for the reasons described above, such a shift in this embodiment is significantly smaller than that in the comparative example. If the one-step travel amount w2 is ⅛ of the one-step travel amount w1, a possible shift in this embodiment is about ⅛ of a shift of the comparative example. As clearly shown in a comparison between FIG. 10A and FIG. 10B, since the medium width PW calculated by Equation (1) includes the term of STn2×w2, the medium width PW is very close to an actual medium width of the medium P than the medium width PW calculated by Equation (2) not having a term expressed by such a multiple of the one-step travel amount w2.

Referring now to FIG. 7, a large-size medium width detection process will be described.

Figure 9:
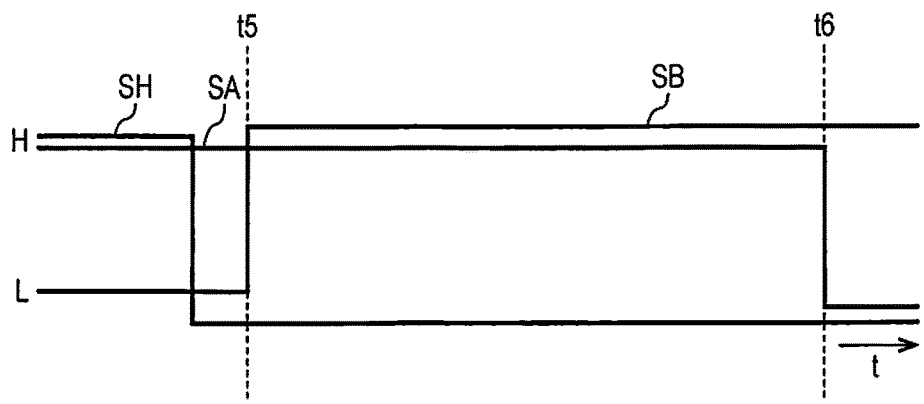
FIG. 9 is a graph showing detection signals associated with the large-size medium width detection process.

FIG. 9 shows changes of the detection signals SA, SB, and SH input from the sensors 83A, 83B, and 90 associated with the large-size medium width detection process. In a manner similar to FIG. 8, in FIG. 9, the abscissa represents the time t, and the ordinate represents voltage levels of the detection signals SA, SB, and SH.

In step S220, the control unit 120 (carriage control unit 142) sends a step control signal to the motor driving circuit 131 to thereby start movement of the carriage 82 under the second movement control, specifically, movement from the home position HP toward the away position AP in this example. With the start of such movement of the carriage 82, the detection signal SH of the position sensor 90 changes from the H level to the L level (see FIG. 9). At the time of start of this movement, the detection signal SA of the sensor 83A is at the H level.

Next, the control unit 120 determines whether the sensor 83 located rearward in movement between the sensors 83A and 83B, that is, the sensor 83B in this case, has detected an edge of the medium P or not (step S230). Referring to the example of FIG. 5, when the carriage 82 starts moving from the home position HP, the sensor 83B located rearward in movement passes under the side edge PE1 of the medium P (medium LP). At this time, the detection signal SB of the sensor 83B rises from the L level to the H level (see reference character t5 in FIG. 9). Accordingly, at timing t5 when the control unit 120 recognizes that the input detection signal SB of the sensor 83B rises from the L level to the H level, the control unit 120 selects "Yes" in step S230, and the process proceeds to step S240.

In step S240, the control unit 120 (the counter 144 of the detection processing unit 143) starts counting the number of steps of the electric motor 103.

After step S240, the control unit 120 determines whether the carriage 82 has finished moving in a first range R1 based on a previously specified size of the medium or not (step S250). If it is determined that the carriage 82 has finished moving in the first range R1, the process proceeds to step S260.

In step S260, the control unit 120 (carriage control unit 142) sends a step control signal to the motor driving circuit 131 to thereby switch from the second movement control to the first movement control, and continues movement of the carriage 82.

In the small-size medium width detection process (steps S120 to S210), to enable the sensors 83 (sensor 83B) located rearward in movement between the sensors 83A and 83B to detect the medium width, switching from the first movement control to the second movement control is performed in response to the rising of the detection signal SA from the sensors 83 (sensor 83A) located forward in movement from the L level to the H level. In the large-size medium width detection process (steps S220 to S310), however, such switching of the movement control depending on a preceding change of the detection signal of the sensors 83 cannot be performed. Thus, this embodiment introduces an idea of the first range R1 and a third range R3 in which the second movement control is to be performed and a second range R2 in which the first movement control is to be performed, for the large-size medium width detection process.

Suppose that the carriage 82 is caused to move from the home position HP to the away position AP in order to detect the medium width, the first range R1 is a range using the home position HP as a start position in the movable range of the carriage 82, and is expected to include the side edge PE1 of the large-size medium closer to home position HP. The third range R3 is a range using the away position AP as a goal position in the movable range of the carriage 82, and is expected to include the side edge PE2 closer to the away position AP of the large-size medium. The length of the first range R1 is equal to the length of the third range R3. The second range R2 is sandwiched between the first range R1 and the third range R3 in the movable range of the carriage 82, and do not overlap any of the first range R1 and the third range R3.

The previously specified size of the medium refers to the size of the medium P acquired by the width information acquisition unit 141 from print setting information included in the print job data PD, for example. As described above, the width information acquisition unit 141 acquires the setting medium width based on the size of the medium P. Thus, the control unit 120 sets the length of about 10% of the setting medium width as the length of each of the first range R1 and the third range R3. By setting the lengths of the first range R1 and the third range R3, the control unit 120 can set the other part of the range in the movable range of the carriage 82 as the second range R2. In this manner, based on the previously specified size of the medium, the first through third ranges R1, R2, and R3 can be set.

After determining the first range R1, in step S250, the control unit 120 determines whether the carriage 82 has finished moving in the first range R1 or not. In step S220, the control unit 120 starts movement of the carriage 82 from the home position HP, and based on the subsequent number of steps of the electric motor 103 (and the one-step travel amount), the control unit 120 can obtain the current location (location relative to the home position HP) of the carriage 82. Thus, when the current location of the carriage 82 reaches the terminal end of the first range R1 (the location closest to the away position AP in the first range R1), the control unit 120 determines that the carriage 82 has finished moving in the first range R1 ("Yes" in step S250), and the process proceeds to step S260. That is, the carriage 82 moves in the first range R1 under the second movement control.

If "Yes" is selected in step S230, the control unit 120 may switch from the second movement control to the first movement control in step S240 and start counting the number of steps of the electric motor 103. That is, at the time when the sensor 83B located rearward in movement detects an edge of the medium P (medium LP), the control unit 120 determines that the first range R1 is finished, and performs step S260 substantially at the same time as step S240 so that determination in step S250 can be unnecessary. In this case, it can be assumed that the carriage 82 moves in a part of the first range R1 under the second movement control.

After step S260, the control unit 120 determines whether the carriage 82 has finished moving in the second range R2 or not (step S270). If the control unit 120 determines that the carriage 82 has finished moving in the second range R2, the process proceeds to step S280. That is, when the current location of the carriage 82 reaches the terminal end of the second range R2 (the location closest to the away position AP in the second range R2), the control unit 120 determines that the carriage 82 has finished moving in the second range R2 ("Yes" in step S270), and the process proceeds to step S280. In this manner, the carriage 82 moves in the second range R2 under the first movement control.

In step S280, the control unit 120 (carriage control unit 142) sends a step control signal to the motor driving circuit 131 to thereby switch from the first movement control to the second movement control, and continues movement of the carriage 82.

Next, the control unit 120 determines whether the sensor 83 located forward in movement between the sensors 83A and 83B, that is, the sensor 83A in this case, has detected the other edge of the medium P or not (step S290). Referring to the example of FIG. 5, after the carriage 82 has started moving from the home position HP and the sensor 83B located rearward in movement has passed under the side edge PE1 of the medium P (medium LP), the sensor 83A located forward in movement passes under the side edge PE2 of the medium P (medium LP). At this time, the detection signal SA of the sensor 83A falls from the H level to the L level (see reference character t6 in FIG. 9). Accordingly, at timing t6 when the control unit 120 recognizes that the input detection signal SA of the sensor 83A falls from the H level to the L level, the control unit 120 selects "Yes" in step S290, and the process proceeds to step S300.

In step S300, the control unit 120 (carriage control unit 142) sends a step control signal to the motor driving circuit 131 to thereby switch from the second movement control to the first movement control, and continues movement of the carriage 82. Thereafter, the control unit 120 may stop the carriage 82 at the away position AP or may return the carriage 82 to the home position HP. In this manner, the carriage 82 moves in the third range R3 (at least a portion of the third range R3 to the location at which the sensor 83A located forward in movement passes under the side edge PE2 of the medium P (medium LP)) under the second movement control. In addition, in step S300, the control unit 120 (the counter 144 of the detection processing unit 143) finishes counting the number of steps of the electric motor 103 started in step S240.

In step S310, the control unit 120 (the arithmetic unit 145 of the detection processing unit 143) calculates a medium width of the medium P (medium LP) based on the number of steps counted in the period of steps S240 to S300 and the distance between the sensor 83A and the sensor 83B in the width direction X (inter-center distance L1). The control unit 120 calculates the medium width (e.g., stores the calculated medium width in a predetermined storage region as necessary), and finishes the flowchart (medium width detection process).

The number of steps of the electric motor 103 counted as described above is the number of steps corresponding to a period from when the sensor 83 (sensor 83B) located rearward in movement detects the side edge PE1 of the medium P to when the sensor 83 (sensor 83A) located forward in movement detects the side edge PE2 of the medium P. Thus, in step S310, the medium width is calculated based on a detection result of an edge of the medium by the sensor 83 located rearward in movement in the movement of the carriage 82 in the first range R1, a detection result of the other edge of the medium by the sensor 83 located forward in movement in the movement of the carriage 82 in the third range R3, and the distance between the two sensors in the width direction X.

Figure 11A:
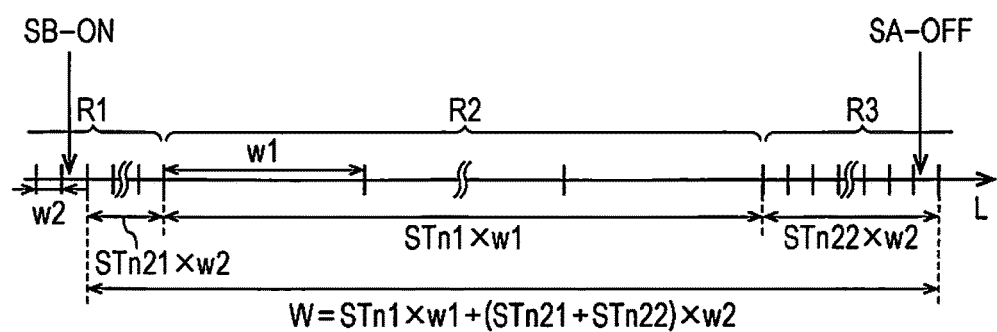
FIG. 11A is a view for describing how the medium width is calculated in the large-size medium width detection process.
Figure 11B:
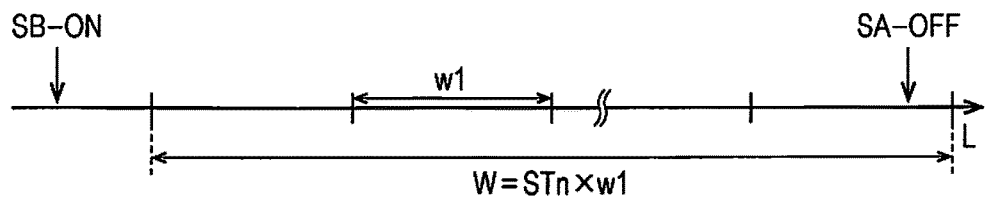
FIG. 11B shows a comparative example of FIG. 11A.

FIG. 11A is a view for describing a process of calculating a medium width performed by the arithmetic unit 145 in step S310. FIG. 11B shows a comparative example of FIG. 11A. For components in FIGS. 11A and 11B denoted by the same reference characters as those in FIGS. 10A and 10B, see description for corresponding components in FIGS. 10A and 10B as necessary. It should be noted that in FIGS. 11A and 11B, reference character SB-ON represents the position of the sensor 83B at the timing when the detection signal SB of the sensor 83B rises from the L level to the H level, that is, at timing t5 when the control unit 120 selects "Yes" in step S230. Reference character SA-OFF represents the position of the sensor 83A at the timing when the detection signal SA of the sensor 83A falls from the H level to the L level, that is, at timing t6 when the control unit 120 selects "Yes" in step S290. Thus, in FIGS. 11A and 11B, the distance from reference character SB-ON to reference character SA-OFF can be the distance obtained by subtracting the inter-center distance L1 from an actual medium width of the medium P. In FIGS. 11A and 11B, the locations of reference character SB-ON and SA-OFF are the same.

FIG. 11A shows a part of the first range R1, the second range R2, and a part of the third range R3. In FIG. 11A, reference character STn1 represents the number of steps of the electric motor 103 counted in a period from when the control unit 120 switches to the first movement control in step S260 to when the control unit 120 switches to the second movement control in step S280, that is, in the entire period in which the carriage 82 moves in the second range R2. Reference character STn21 represents the number of steps counted in a period from when the control unit 120 starts counting the number of steps in step S240 to when the control unit 120 switches to the first movement control in step S260, that is, in a period in which the carriage 82 moves in the first range R1 of the carriage after the start of the counting. Reference character STn22 represents the number of steps counted in a period from when the control unit 120 switches to the second movement control in step S280 to when the control unit 120 finishes counting the number of steps in step S300, that is, until the counting is finished in a period in which the carriage 82 moves in the third range R3. That is, the number of steps STn1 is the number of steps in movement under the first movement control in the number of steps of the electric motor 103 counted in the period of steps S240 to S300. The number of steps STn21+STn22 is the number of steps the electric motor 103 in movement under the second movement control in the number of steps of the electric motor 103 counted in the period of steps S240 to S300.

Thus, step S310, the control unit 120 calculates a width W by Equation (3):

$$W = STn1 \times w1 + (STn21 + STn22) \times w2 \quad (3)$$

and the control unit 120 calculates a medium width PW by adding an inter-center distance L1 to the width W. That is, the medium width PW=W+L1, and the control unit 120 recognizes the distance from the reference character SB-ON to the reference character SA-OFF as a width W.

On the other hand, in the comparative example shown in FIG. 11B, switching between the first movement control and the second movement control as described in this embodiment is not performed, and the control unit 120 merely performs only the first movement control in order to move the carriage 82. Accordingly, in the comparative example, the control unit 120 starts counting after the sensor 83B located rearward in movement and included in the carriage 82 has detected an edge (side edge PE1) of the medium P (medium LP). Based on the number of steps (the number of steps STn) of the electric motor 103 in a case where counting is finished after the sensor 83A located forward in movement has detected the other edge (side edge PE2) of the medium P (medium LP), a width W is calculated by Equation (4):

$$W = STn \times w1 \quad (4)$$

and the control unit 120 calculates a medium width PW by adding an inter-center distance L1 to the width W.

As described above, a shift from an actual medium width of the medium P can occur in the medium width PW based on the number of steps of the electric motor 103 counted by the control unit 120. In view of situations where such a shift can occur, this embodiment (FIG. 11A) obtains a significantly higher detection accuracy of the medium width than the comparative example (FIG. 11B). That is, in the large-size medium width detection process, based on the previously specified size of the medium, the control unit 120 sets, in the movable range of the carriage 82, the first range R1 that is expected to include the side edge PE1 of the large-size medium closer to the home position HP, and the third range R3 that is expected to include the side edge PE2 of the large-size medium closer to the away position AP. Then, in the first range R1 and the third range R3, the movement control of the carriage 82 switches to the second movement control having a high resolution (i.e., having a narrow one-step travel amount w2). In this manner, at the time when the sensors 83 (sensor 83B) located rearward in movement detects side edge PE1 of the medium P (medium LP) or the time when the sensors 83 (sensor 83A) located forward in movement detects the side edge PE2 of the medium P (medium LP), the movement control of the carriage 82 is the second movement control. Thus, even when a shift can occur between an actual medium width of the medium P and the medium width PW based on the number of steps for the reasons described above, such a shift in this embodiment is significantly smaller than that in the comparative example. If the one-step travel amount w2 is ⅛ of the one-step travel amount w1, a possible shift in this embodiment is about ⅛ of a shift of the comparative example. As clearly shown in a comparison between FIG. 11A and FIG. 11B, since the width W calculated by Equation (3) includes the term of (STn21+STn22)×w2, the width W is very close to a distance obtained by subtracting the inter-center distance L1 from an actual medium width of the medium P than the width W calculated by Equation (4) not having a term expressed by such a multiple of the one-step travel amount w2.

In this manner, in this embodiment, the control unit 120 can selectively perform the first movement control of changing the location of the carriage 82 with the first resolution and the second movement control of changing the location of the carriage 82 with the second resolution higher than the first resolution. In steps S120 to S210 shown in FIG. 6, the control unit 120 causes the carriage 82 to move under the first movement control, and after the sensor 83A located forward in movement in the two sensors 83A and 83B has detected one edge (side edge PE1) of the medium P, the control unit 120 switches from the first movement control to the second movement control to cause the carriage 82 to move. Thereafter, after the sensor 83B located rearward in movement has detected the edge (side edge PE1), the control unit 120 switches from the second movement control to the first movement control to cause the carriage 82 to move, and then, after the forward sensor 83A has detected the other edge (side edge PE2) of the medium P, the control unit 120 switches from the first movement control to the second movement control to cause the carriage 82 to move. Subsequently, in a case where the rearward sensor 83B detects the other edge (side edge PE2), the control unit 120 calculates a medium width PW of the medium P based on the detection result of the edge (side edge PE1) and the other edge (side edge PE2) obtained by the rearward sensor 83B.

In this embodiment, in a case where any one of the sensors 83A and 83B detects the medium P while the carriage 82 is at an end (e.g., at the home position HP) in the movable range, that is, the medium P is a large-size medium, the control unit 120 moves the first range R1 based on the previously specified size of the medium P under the second movement control in the process of moving the carriage 82 from the end to the other end (away position AP) in the movable range, and then moves the second range R2 based on the size of the medium P under the first movement control. After the movement of the second range R2, the control unit 120 moves the third range R3 based on the size of the medium P under the second movement control, and calculates a medium width PW of the medium P based on a detection result of an edge (side edge PE1) of the medium P obtained by the rearward sensor 83B in movement of the carriage 82 in the first range R1, a detection result of the other edge (side edge PE2) of the medium P obtained by the forward sensor 83A in movement of the carriage 82 in the third range R3, and the distance between the two sensors 83A and 83B in the width direction X (inter-center distance L1) (steps S220 to S310).

In this embodiment, in addition to an advantage of an increased accuracy in detecting a medium width as described above, an increase in the speed of detecting the medium width can be obtained. As clearly shown in the description of the small-size medium width detection process and the large-size medium width detection process, in the movement control of the carriage 82 by driving the electric motor 103, the control unit 120 minimizes a period employing the second movement control having a high resolution. The counter 144 of the detection processing unit 143 counts the number of steps one by one in accordance with interruption caused by a timer incorporated in the control unit 120 at each interval of one step, in a period in which the number of steps of the electric motor 103 is counted (steps S160 to S200 or steps S240 to S300). The interval of the interruption differs between the case where the carriage control unit 142 performs the first movement control and the case where the carriage control unit 142 performs the second movement control. In the case of the second movement control, of course, the number of steps is counted at shorter intervals. As the interval of counting the number of steps as described above decreases, a load on the CPU mounted on the control unit 120 increases.

Since the control unit 120 controls driving not only the electric motor 103 but also the other motors 121 to 125, the increased load described above reduces a resource that can be allocated to driving control of the electric motor 103, resulting in difficulty in high-speed movement of the carriage 82. In other words, in the case of performing the first movement control, a load is smaller than that in the case of performing the second movement control, and thus, the control unit 120 can move the carriage 82 at relatively high speed. In this embodiment, the first movement control is executed in most part of a period in which the counter 144 of the detection processing unit 143 counts the number of steps of the electric motor 103 (steps S160 to S200 or steps S240 to S300), and consequently, the carriage 82 can move at high speed. That is, an increase in time necessary for detecting the medium width can be avoided with increased accuracy in detecting the medium width.

In this embodiment, neither a linear encoder nor a rotary encoder as described above is necessary for medium width detection. Thus, problems such as an increased cost of products caused by incorporation of these encoders and difficulty in obtaining an installation location of these encoders in the body casing 20 do not occur, thereby obtaining cost reduction and size reduction of products.

As described above, the carriage 82 can move in the width direction X at a location upstream of the print head 34 in the transport direction Y. Thus, the sensors 83A and 83B can detect a side edge of the medium P at a location upstream of the print head 34 in the transport direction Y. Accordingly, the control unit 120 can also use the medium width PW obtained in step S210 of the small-size medium width detection process or step S310 of large-size medium width detection process, for control of the print head 34 that performs printing at a downstream location.

For example, if the medium width PW is smaller than the setting medium width, when the print head 34 executes printing based on the print image data generated based on the setting medium width, ink is also ejected to the outside the medium P that is being transported by the transport unit 32 so that the transport belt 61 of the belt transport mechanism 58 and other component are unintentionally stained by ink. To avoid such erroneous ink ejection, if medium width PW is smaller than the setting medium width, the control unit 120 may cancel subsequent printing by the print head 34. In addition, the control unit 120 can issue an error notification indicating the cancellation of printing to a user through the display unit 15, for example.

Examples of criteria for determining whether or not a medium width detection process should be performed on a medium P as a current target of feeding in step S100 will be specifically described.

For example, the control unit 120 may perform a medium width detection process on a medium P that was first transported (fed) by the transport unit 32 from a predetermined transport source of the medium P after power of the printing device 11 was turned on. The predetermined transport source is, for example, the cassette 21 or the paper feed tray 22. A user operates an unillustrated main power supply button included in the printing device 11 to turn on or off power of the printing device 11. The control unit 120 determines whether the medium P as the current target of feeding (i.e., the medium P fed from the cassette 21 or the paper feed tray 22) is a medium P first fed by the transport unit 32 after latest turning on of power of the printing device 11 or not. If the current target medium P is the first fed medium P, "Yes" is selected in step S100, and the process proceeds to step S110. In such an example, in a case where the user changes the media P in the cassette 21 or on the paper feed tray 22 while power of the printing device 11 is off, the control unit 120 can detect a medium width PW in first feeding after power is turned on to determine whether the medium width PW coincides with a setting medium width or not.

For example, the control unit 120 may perform a medium width detection process on a medium P that was first transported (fed) from the cassette 21 by the transport unit 32 after the cassette 21 was drawn from the body casing 20 and then housed in the body casing 20 while power of the printing device 11 is on. Even while power of the printing device 11 is on, a user can draw the cassette 21 from the body casing 20 at any timing and then can house the cassette 21 in the body casing 20. The control unit 120 can detect that the cassette 21 is drawn or that the cassette 21 is housed, through an unillustrated sensor. The control unit 120 determines whether or not the medium P as the current target of feeding (i.e., the medium P fed from the cassette 21) is a medium P first fed from the transport unit 32 after latest drawing of the cassette 21 and housing of the cassette 21 in the body casing 20. If the current target medium P is the first fed medium P, "Yes" is selected in step S100, and the process proceeds to step S110. In such an example, in a case where the user changes the media P in the cassette 21 by inserting or drawing the cassette 21 while power of the printing device 11 is on, the control unit 120 can detect a medium width PW in next feeding from the cassette 21 to determine whether the medium width PW coincides with a setting medium width or not.

For example, the control unit 120 may perform the medium width detection process on a medium P that was first transported 'fed) from the paper feed tray 22 by the transport unit 32 after the medium P is set on the manual feed tray (paper feed tray 22). The control unit 120 can detect whether the medium P is on the paper feed tray 22 or not, through an unillustrated sensor. The control unit 120 determines the medium P as the current target of feeding (i.e., the medium P fed from the paper feed tray 22) is a medium P first fed from the paper feed tray 22 by the transport unit 32 after latest detection of the medium P on the paper feed tray 22 or not. If the current target medium P is the first fed medium P, "Yes" is selected in step S100, and the process proceeds to step S110. In such an example, in a case where the user arbitrarily sets the medium P on the paper feed tray 22, the control unit 120 can detect the medium width PW in next feeding from the paper feed tray 22 to determine whether the medium width PW coincides with a setting medium width or not.

The present disclosure may further employ variations as described below.

Figure 12:
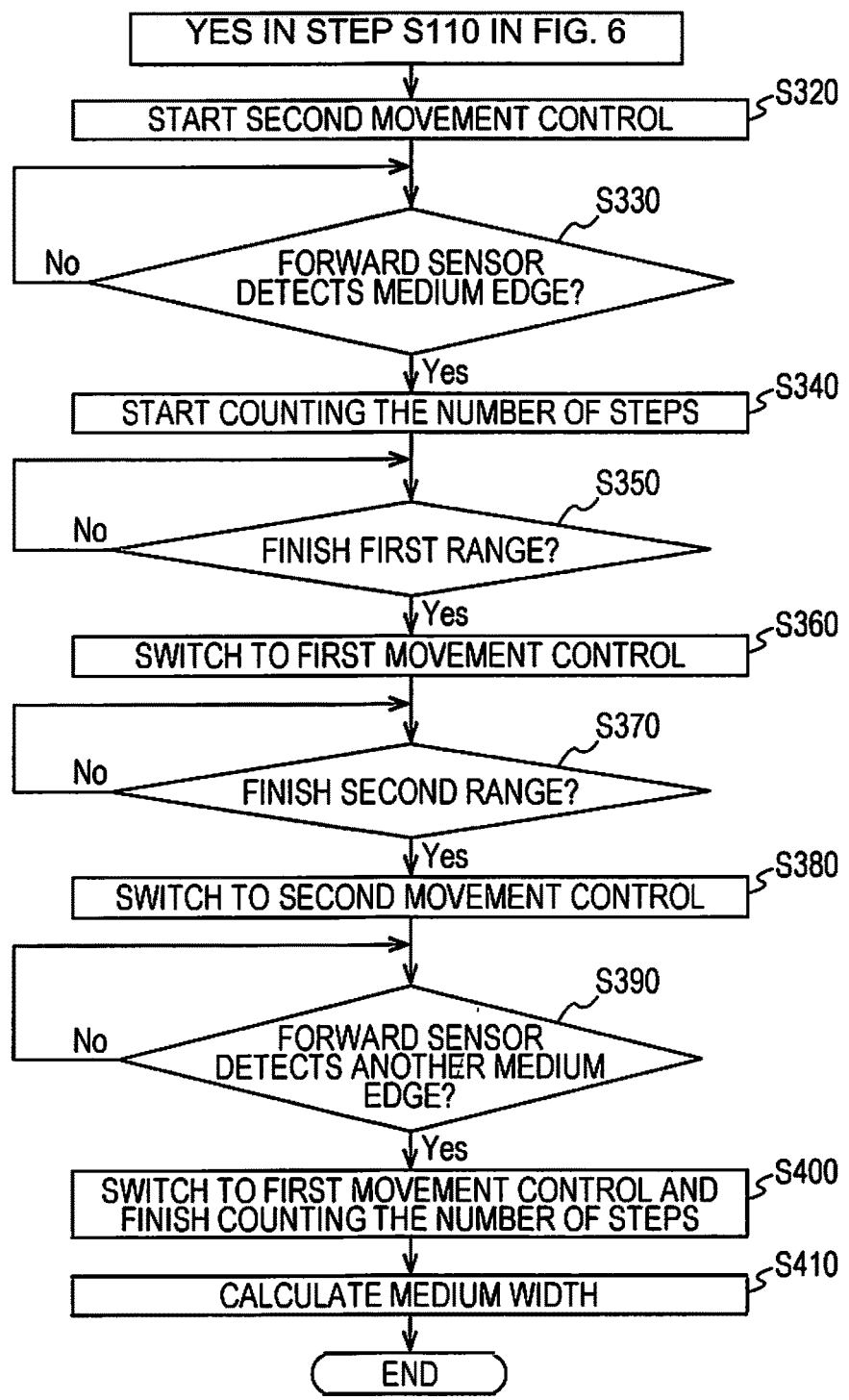
FIG. 12 is a flowchart depicting a medium width detection process (small-size medium width detection process) according to a variation.

FIG. 12 is a flowchart showing a part of a medium width detection process according to a variation. The control unit 120 may perform, as a small-size medium detection process, steps S320 to S410 shown in FIG. 12 instead of steps S120 to S210 shown in FIG. 6. The small-size medium detection process shown in FIG. 12 will be described using comparison with the large-size medium detection process (steps S220 to S310) shown in FIG. 7 as appropriate.

Step S320 is the same as step S220. Next, the control unit 120 determines whether one of the sensors 83A and 83B, for example, the sensor 83A located forward in movement, detects an edge of the medium P or not (step S330). Referring to the example of FIG. 5, when the carriage 82 starts moving from the home position HP, the sensor 83A located forward in movement passes under the side edge PE1 of the medium P (medium SP). At this time, the detection signal SA of the sensor 83A rises from the L level to the H level (see reference character t1 in FIG. 8). Accordingly, at timing t1 when the control unit 120 recognizes that the input detection signal SA of the sensor 83A rises from the L level to the H level, the control unit 120 selects "Yes" in step S330, and the process proceeds to step S340.

Step S340 is the same as step S240. After step S340, the control unit 120 determines whether the carriage 82 has finished moving in the first range based on a previously specified size of the medium or not (step S350). If the control unit 120 determines that the carriage 82 has finished moving in the first range, the process proceeds to step S360. In the small-size medium width detection process (steps S320 to S410) according to this variation, an idea of a first range and a third range in which the second movement control is to be performed and a second range in which the first movement control is to be performed is employed, in a manner similar to the large-size medium detection process (steps S220 to S310). The first range in this variation is a range using the home position HP as a start position in the movable range of the carriage 82 and expected to include the side edge PE1 of the small-size medium closer to the home position HP. Similarly, the third range is a range using the away position AP as a goal position in the movable range of the carriage 82 and expected to include the side edge PE2 of the small-size medium closer to the away position AP. The length of the first range is equal to the length of the third range. The second range is a range sandwiched between the first range and the third range in the movable range of the carriage 82 and do not overlap any of the first range and the third range.

The settings of the first range, the second range, and the third range are, of course, different between the small-size medium width detection process (steps S320 to S410) and the large-size medium detection process (steps S220 to S310), but steps S340 to S400 are basically the same as steps S240 to S300. The control unit 120 determines whether the sensor 83 of the sensors 83A and 83B that used the detection signal for the determination in step S330, that is, the sensor 83A located forward in movement, has determined the other edge of the medium P or not (step S390). Referring to the example of FIG. 5, after the carriage 82 has started moving from the home position HP and the sensor 83A located forward in movement has passed under the side edge PE1 of the medium P (medium SP), the sensor 83A passes under the side edge PE2 of the medium P (medium SP). At this time, the detection signal SA of the sensor 83A falls from the H level to the L level (see reference character t3 in FIG. 8). Accordingly, at timing t3 when the control unit 120 recognizes that the input detection signal SA of the sensor 83A falls from the H level to the L level, the control unit 120 selects "Yes" in step S390, and the process proceeds to step S400.

In step S410, the control unit 120 (the arithmetic unit 145 of the detection processing unit 143) calculates the medium width of the medium P (medium SP) based on the number of steps of the electric motor 103 counted in the period of steps S340 to S400. That is, in this variation, the control unit 120 determines the start and end of counting the number of steps of the electric motor 103 based on only the detection signal SA of the sensor 83A of the two sensors 83A and 83B. In a manner similar to the process described with reference to FIGS. 6 and 7, such a small-size medium width detection process according to this variation can also obtain a highly accurately detected medium width PW, and can obtain advantages such as increased speed in detecting the medium width and reduced cost and size of products.

In the case of causing the carriage 82 moving from the away position AP toward the home position HP to stop at the home position HP, the control unit 120 instructs rotations corresponding to a predetermined number of steps to the electric motor 103 to stop the carriage 82 in response to reception of the detection signal SH at the H level indicating detection of the carriage 82 from the position sensor 90. In this manner, the control unit 120 stops the carriage 82 before the carriage 82 abuts a wall closer to the home position HP in the movable range. In other words, in this embodiment, in stopping the carriage 82 at the home position HP, the carriage 83 does not hit a wall of, for example, a cushioning material to stop (contact stop). By avoiding the contact stop, it is possible to prevent a loss of synchronization of the electric motor 103 due to an overload on the motor 103.

As described above, the print head 34 is an elongated line head extending in the width direction X. However, as described above, the printing unit 33 may employ a serial printing method in which the printing unit 33 includes a printing carriage movable in the width direction X so that the print head 34 moves in the width direction X (main scanning direction) together with the printing carriage. In this case, the two sensors 83A and 83B may be mounted on the printing carriage together with the print head 34.

Functional units constructed in the control unit 120 are not limited to implementation by software with a computer for executing programs, and may be implemented by hardware with an electronic circuit such as field-programmable gate array (FPGA) or application specific IC (ASIC), or may be implemented by cooperation of software and hardware.

The medium P is not limited to a paper sheet, and may be a resin film or sheet, a composite film of a resin and a metal (a laminated film), textile fabric, nonwoven fabric, a metal foil, a metal film, or a ceramic sheet, for example.

What is claimed is:

1. A printing device comprising:
   a transport mechanism that transports a medium;
   a print head that performs printing on the medium;
   a carriage that moves in a width direction intersecting a transport direction of the medium by the transport mechanism;
   two sensors mounted on the carriage and disposed at different locations in the width direction; and
   a controller that controls at least movement of the carriage, wherein
   the controller
      is switchable between a first movement control of changing a location of the carriage with a first resolution and a second movement control of changing a location of the carriage with a second resolution higher than the first resolution, and
      causes the carriage to move in the width direction under the first movement control so that a first edge of the medium is detected by one of the two sensors located forward in movement, and then switches from the first movement control to the second movement control and causes the carriage to move in the width direction so that the first edge of the medium is detected by one of the two sensors located rearward in movement.

2. The printing device of claim 1, wherein
   in a case where one of the two sensors detects the medium while the carriage is located at one end of a movable range in which the carriage is movable in the width direction,
   the controller moves a first range based on a previously specified size of the medium under the second movement control in a process of causing the carriage to move from the one end of the movable range toward the other end of the movable range.

3. The printing device of claim 1, wherein
   the carriage is movable in the width direction independently of the print head at a location upstream of the print head in the transport direction.

4. The printing device of claim 1, wherein
   the controller detects the first edge of the medium that is first transported by the transport mechanism from a predetermined transport source of the medium after power is turned on.

5. The printing device of claim 3, wherein
   the controller detects the first edge of the medium that is first transported by the transport mechanism from a cassette as a predetermined transport source of the medium after the cassette is drawn from a body casing and is housed in the body casing while power is on.

6. The printing device of claim 1, wherein
   the controller detects the first edge of the medium that is first transported by the transport mechanism from a manual feed tray as a predetermined transport source of the medium after the medium is set on the manual feed tray.

7. The printing device of claim 1, wherein
   after the first edge of the medium is detected by the one of the two sensors located rearward in the movement,
   the controller switches from the second movement control to the first movement control and causes the carriage to move in the width direction so that the one of the two sensors located forward in the movement detects a second edge of the medium, then
   the controller switches from the first movement control to the second movement control and causes the carriage to move in the width direction so that the one of the two sensors located rearward in the movement detects the second edge of the medium, and then
   the controller calculates a length of the medium in the width direction based on detection results of the first and second edges of the medium.

8. The printing device of claim 7, wherein
   in a case where one of the two sensors detects the medium while the carriage is located at one end of a movable range in which the carriage is movable in the width direction,
   the controller moves a first range based on a previously specified size of the medium under the second movement control in a process of causing the carriage to move from the one end of the movable range toward the other end of the movable range, then
   the controller moves a second range based on the size of the medium under the first movement control, and after the movement of the second range, the controller moves a third range based on the size of the medium under the second movement control, and then
   the controller calculates a length of the medium in the width direction based on a detection result of the first edge of the medium obtained by the one of the two sensors located rearward in the movement in the first range, a detection result of the second edge of the medium obtained by the one of the two sensors located forward in the movement in the third range, and a distance between the two sensors in the width direction.

9. The printing device of claim 7, wherein
   the carriage is movable in the width direction independently of the print head at a location upstream of the print head in the transport direction.

10. The printing device of claim 7, wherein
    the controller calculates the length in the width direction of the medium that is first transported by the transport mechanism from a predetermined transport source of the medium after power was turned on.

11. The printing device of claim 7, wherein
the controller calculates the length in the width direction of the medium that is first transported by the transport mechanism from a cassette as a predetermined transport source of the medium after the cassette is drawn from a body casing and is housed in the body casing while power is on.

12. The printing device of claim 7, wherein
the controller calculates the length in the width direction of the medium that is first transported by the transport mechanism from a manual feed tray as a predetermined transport source of the medium after the medium is set on the manual feed tray.

13. A printing device controlling method for controlling a printing device including
a transport mechanism that transports a medium,
a print head that performs printing on the medium,
a carriage that moves in a width direction intersecting a transport direction of the medium by the transport mechanism, and
two sensors mounted on the carriage and disposed at different locations in the width direction, the printing device controlling method comprising:
causing the carriage to move in the width direction under a first movement control of changing a location of the carriage with a first resolution so that one of the two sensors located forward in movement detects a first edge of the medium; then
switching from the first movement control to a second movement control of changing a location of the carriage with a second resolution higher than the first resolution; and then
moving the carriage in the width direction so that the first edge of the medium is detected by one of the two sensors located rearward in movement.

14. The printing device controlling method of claim 13, further comprising
after the first edge of the medium is detected by the one of the two sensors located rearward in the movement, switching from the second movement control to the first movement control and causing the carriage to move in the width direction so that the one of the two sensors located forward in the movement detects a second edge of the medium, then
switching from the first movement control to the second movement control and causing the carriage to move in the width direction so that the one of the two sensors located rearward in the movement detects the second edge of the medium, and then
calculating a length of the medium in the width direction based on detection results of the first and second edges of the medium.

\* \* \* \* \*